(12) United States Patent
Agassi et al.

(10) Patent No.: US 8,164,300 B2
(45) Date of Patent: Apr. 24, 2012

(54) BATTERY EXCHANGE STATION

(75) Inventors: Shai Agassi, Palo Alto, CA (US); Yoav Heichal, Ganey Yehuda (IL)

(73) Assignee: Better Place GmbH, Zug (CH)

( * ) Notice: Subject to any disclaimer, the term of this patent is extended or adjusted under 35 U.S.C. 154(b) by 4 days.

(21) Appl. No.: 12/563,103

(22) Filed: Sep. 18, 2009

(65) Prior Publication Data

US 2010/0141206 A1 Jun. 10, 2010

Related U.S. Application Data

(60) Provisional application No. 61/166,239, filed on Apr. 2, 2009, provisional application No. 61/206,913, filed on Feb. 4, 2009, provisional application No. 61/149,690, filed on Feb. 3, 2009, provisional application No. 61/098,724, filed on Sep. 19, 2008.

(51) Int. Cl.
*H02J 7/00* (2006.01)
*B60L 1/00* (2006.01)
*B60L 3/00* (2006.01)
*H02G 3/00* (2006.01)
*B65G 67/00* (2006.01)
*B65G 1/00* (2006.01)
*B65F 9/00* (2006.01)

(52) U.S. Cl. ........ 320/104; 307/9.1; 307/10.1; 320/109; 414/288; 414/401; 414/281; 414/389

(58) Field of Classification Search .................. 320/109, 320/115, 107, 150, 104; 296/15; 414/809, 414/269, 268, 294, 323, 288, 401, 281, 354, 414/356, 389; 307/10.1, 9.1; 104/34, 217, 104/205, 43; 52/169.7

See application file for complete search history.

(56) References Cited

U.S. PATENT DOCUMENTS

| 3,197,830 A | 8/1965 | Hoadley |
| 3,681,805 A | 8/1972 | Shelstad et al. |

(Continued)

FOREIGN PATENT DOCUMENTS

CN 101702425 A 5/2010

(Continued)

OTHER PUBLICATIONS

International Search Report and Written Opinion issued in PCT/US2008/077132 on Dec. 1, 2008, 8 pages by ISA/US.

(Continued)

*Primary Examiner* — Melissa Koval
*Assistant Examiner* — Alexis Boateng
(74) *Attorney, Agent, or Firm* — Morgan, Lewis & Bockius LLP

(57) ABSTRACT

At a battery exchange station a discharged battery is removed and a charged battery is inserted into an electric vehicle. The battery exchange station has various mechanisms to make this exchange. In some embodiments, the batteries are stored in a warehouse, where they are given an appropriate amount of charge. The charged batteries are moved from the warehouse by an automated robotic mechanism. The automated robotic system provides the charged battery to a battery exchange system which inserts the charged battery into the vehicle after it removes the discharged battery from the vehicle. The insertion and removal of the battery is done vertically, i.e., into and out of the bottom of the vehicle. The battery exchange system is located in a service bay under the vehicle. A sliding door system creates an opening above the service bay. The opening is of variable size depending on the size of the vehicle.

24 Claims, 23 Drawing Sheets

U.S. PATENT DOCUMENTS

| | | | |
|---|---|---|---|
| 3,690,397 A | 9/1972 | Parker | 180/65 |
| 3,719,151 A | 3/1973 | Andersen | |
| 3,799,063 A | 3/1974 | Reed | 104/134 |
| D235,555 S | 6/1975 | Plummer | 26/5 R |
| D237,718 S | 11/1975 | Bozich | D26/12 |
| 4,052,655 A | 10/1977 | Vizza | 320/2 |
| 4,087,895 A | 5/1978 | Etienne | |
| 4,102,273 A | 7/1978 | Merkle et al. | 104/34 |
| 4,217,628 A | 8/1980 | Windom | |
| 4,309,644 A | 1/1982 | Reimers et al. | 318/139 |
| 4,338,587 A | 7/1982 | Chiappetti | 340/32 |
| 4,347,472 A | 8/1982 | Lemelson | 320/2 |
| 4,352,992 A | 10/1982 | Buennagel et al. | 307/40 |
| 4,365,681 A | 12/1982 | Singh | 180/68.5 |
| 4,383,210 A | 5/1983 | Wilkinson | 320/2 |
| 4,404,641 A | 9/1983 | Bazarnik | 364/569 |
| D270,831 S | 10/1983 | Jensen | D13/40 |
| 4,532,418 A | 7/1985 | Meese et al. | 235/381 |
| 4,532,511 A | 7/1985 | Lemelson | 340/933 |
| D286,040 S | 10/1986 | LaValle | D8/347 |
| D286,854 S | 11/1986 | Fane et al. | D8/347 |
| 4,709,202 A | 11/1987 | Koenck et al. | 320/43 |
| 4,789,047 A | 12/1988 | Knobloch | 184/1.5 |
| 4,791,871 A | 12/1988 | Mowll | 104/94 |
| 4,800,328 A | 1/1989 | Bolger et al. | 320/2 |
| D299,821 S | 2/1989 | Dively | D13/31 |
| 4,846,697 A | 7/1989 | Rodgers | 439/35 |
| 4,861,971 A | 8/1989 | Chan | 235/384 |
| 4,876,513 A | 10/1989 | Brilmyer et al. | 324/427 |
| 4,876,540 A | 10/1989 | Berthon et al. | 340/932.2 |
| 4,880,097 A | 11/1989 | Speas | 194/239 |
| D307,580 S | 5/1990 | Reali | D13/133 |
| D308,267 S | 5/1990 | Bradd | D32/31 |
| 4,960,150 A | 10/1990 | Ryan | 137/234 |
| 4,967,895 A | 11/1990 | Speas | 194/200 |
| D314,182 S | 1/1991 | Moerman | D13/152 |
| 5,003,476 A | 3/1991 | Abe | 364/424.03 |
| 5,003,520 A | 3/1991 | Grieu et al. | 368/90 |
| 5,049,802 A | 9/1991 | Mintus et al. | 320/2 |
| 5,058,044 A | 10/1991 | Stewart et al. | 364/551.01 |
| 5,072,380 A | 12/1991 | Randelman et al. | 364/406 |
| 5,091,856 A | 2/1992 | Hasegawa et al. | 364/424.05 |
| 5,151,865 A | 9/1992 | Blessing et al. | 364/483 |
| 5,157,319 A | 10/1992 | Klontz et al. | 320/2 |
| 5,159,272 A | 10/1992 | Rao et al. | 324/429 |
| 5,184,058 A | 2/1993 | Hesse et al. | 320/4 |
| 5,189,836 A | 3/1993 | Alder et al. | 49/33 |
| 5,202,617 A | 4/1993 | Nor | 320/2 |
| 5,206,578 A | 4/1993 | Nor | 320/14 |
| 5,229,704 A | 7/1993 | Knepper | 320/2 |
| 5,230,637 A | 7/1993 | Weber | 439/504 |
| 5,263,565 A | 11/1993 | Wilkinson | 194/216 |
| 5,297,664 A | 3/1994 | Tseng et al. | 194/217 |
| 5,306,999 A | 4/1994 | Hoffman | 320/2 |
| 5,315,227 A | 5/1994 | Pierson et al. | 320/2 |
| D349,099 S | 7/1994 | Robertson, Jr. et al. | D13/147 |
| 5,327,066 A | 7/1994 | Smith | 320/2 |
| 5,349,535 A | 9/1994 | Gupta | 364/483 |
| 5,350,312 A | 9/1994 | Kuno et al. | 439/310 |
| 5,369,352 A | 11/1994 | Toepfer et al. | 320/56 |
| 5,453,585 A | 9/1995 | Lenz et al. | 191/12.2 R |
| 5,461,299 A | 10/1995 | Bruni | 320/2 |
| 5,462,439 A | 10/1995 | Keith | 439/34 |
| 5,478,250 A | 12/1995 | Hoffman | 439/142 |
| 5,504,991 A | 4/1996 | Parmley, Sr. | |
| 5,535,274 A | 7/1996 | Braitberg et al. | 379/446 |
| 5,539,399 A | 7/1996 | Takahira et al. | 340/995 |
| D373,192 S | 8/1996 | Murphy et al. | D24/129 |
| 5,542,488 A | 8/1996 | Nixon | 180/65.1 |
| 5,545,046 A | 8/1996 | Masuda et al. | 439/142 |
| 5,563,491 A | 10/1996 | Tseng | 320/2 |
| 5,568,036 A | 10/1996 | Hirota et al. | 364/449 |
| 5,573,090 A | 11/1996 | Ross | 191/10 |
| 5,585,205 A | 12/1996 | Kohchi | 429/99 |
| 5,590,749 A | 1/1997 | Wagner et al. | 191/12.4 |
| 5,612,606 A * | 3/1997 | Guimarin et al. | 320/109 |
| 5,614,808 A | 3/1997 | Konoya et al. | 320/48 |
| 5,627,448 A | 5/1997 | Okada et al. | 320/2 |
| 5,627,752 A | 5/1997 | Buck et al. | 364/424.04 |
| 5,631,536 A | 5/1997 | Tseng | 320/15 |
| 5,644,209 A | 7/1997 | Chabbert et al. | 320/15 |
| 5,656,916 A | 8/1997 | Hotta | 320/22 |
| 5,696,367 A | 12/1997 | Keith | 235/381 |
| 5,701,706 A | 12/1997 | Kreysler et al. | 52/169.6 |
| 5,703,461 A * | 12/1997 | Minoshima et al. | 320/108 |
| 5,711,648 A | 1/1998 | Hammerslag | 414/786 |
| 5,742,229 A | 4/1998 | Smith | 340/438 |
| 5,758,414 A | 6/1998 | Ehrenfels | 29/857 |
| 5,771,575 A | 6/1998 | Onizuka et al. | |
| 5,815,824 A | 9/1998 | Saga et al. | 701/22 |
| 5,821,731 A * | 10/1998 | Kuki et al. | 320/108 |
| 5,822,427 A | 10/1998 | Braitberg et al. | 379/454 |
| 5,903,064 A | 5/1999 | Norberg | 307/40 |
| 5,906,500 A | 5/1999 | Kakuta et al. | 439/310 |
| 5,913,917 A | 6/1999 | Murphy | 701/123 |
| 5,927,938 A * | 7/1999 | Hammerslag | 414/809 |
| 5,951,229 A * | 9/1999 | Hammerslag | 414/398 |
| D415,111 S | 10/1999 | Lee | D13/154 |
| 5,971,801 A | 10/1999 | Kato et al. | |
| 5,979,605 A | 11/1999 | Popp | 187/205 |
| 5,992,946 A | 11/1999 | Bayer et al. | |
| 5,998,963 A * | 12/1999 | Aarseth | 320/109 |
| 6,002,396 A | 12/1999 | Davies | 345/339 |
| 6,014,597 A * | 1/2000 | Kochanneck | 701/22 |
| D420,644 S | 2/2000 | Nemser et al. | D13/146 |
| 6,088,963 A | 7/2000 | Cawthon et al. | 49/33 |
| 6,094,028 A * | 7/2000 | Gu et al. | 320/109 |
| D429,622 S | 8/2000 | Bickle | D8/347 |
| 6,114,632 A | 9/2000 | Planas, Sr. et al. | 174/117 R |
| 6,123,569 A | 9/2000 | Fukushima et al. | 439/456 |
| D434,001 S | 11/2000 | Sayger | D13/139.5 |
| 6,177,879 B1 | 1/2001 | Kokubu et al. | 340/825.33 |
| 6,196,858 B1 | 3/2001 | Matsumoto et al. | |
| 6,204,505 B1 | 3/2001 | Call | 250/370.01 |
| 6,208,249 B1 | 3/2001 | Saito et al. | |
| 6,240,684 B1 | 6/2001 | Bigelow | 52/174 |
| 6,371,768 B1 | 4/2002 | Neblett et al. | 439/34 |
| 6,388,564 B1 | 5/2002 | Piercy et al. | 340/310.01 |
| 6,487,477 B1 | 11/2002 | Woestman et al. | 701/22 |
| 6,539,678 B1 | 4/2003 | Campbell et al. | 52/169.7 |
| 6,727,809 B1 | 4/2004 | Smith | 340/438 |
| 6,834,907 B2 | 12/2004 | Dietl | |
| 6,909,287 B2 | 6/2005 | Bertness | 324/427 |
| D515,033 S | 2/2006 | Petrick et al. | D13/139.4 |
| 7,003,411 B2 | 2/2006 | Bertness | 702/63 |
| D517,591 S | 3/2006 | Kokido | D17/9 |
| 7,029,040 B2 | 4/2006 | Lippoldt et al. | |
| D522,963 S | 6/2006 | Hayes et al. | D13/108 |
| 7,090,521 B2 | 8/2006 | Nishio et al. | 439/248 |
| 7,158,008 B2 | 1/2007 | Waring et al. | 340/5.66 |
| 7,201,384 B2 * | 4/2007 | Chaney | 180/68.5 |
| 7,256,516 B2 | 8/2007 | Buchanan et al. | 307/62 |
| 7,270,045 B1 | 9/2007 | Gonzalez | |
| D559,785 S | 1/2008 | Tosetti | D13/147 |
| 7,400,113 B2 | 7/2008 | Osborne | |
| 7,411,371 B2 | 8/2008 | Hobbs | 320/128 |
| 7,444,192 B2 | 10/2008 | Dickinson et al. | 700/83 |
| 7,602,143 B2 * | 10/2009 | Capizzo | 320/109 |
| D607,831 S | 1/2010 | Andre et al. | D13/154 |
| 7,826,941 B2 | 11/2010 | Hayashi et al. | 701/22 |
| 7,993,155 B2 | 8/2011 | Heichal et al. | |
| 8,006,793 B2 | 8/2011 | Heichal et al. | |
| 8,013,571 B2 | 9/2011 | Agassi et al. | |
| 2001/0002789 A1 | 6/2001 | Terazoe | 320/108 |
| 2002/0026252 A1 | 2/2002 | Wruck et al. | 700/90 |
| 2003/0209375 A1* | 11/2003 | Suzuki et al. | 180/65.3 |
| 2004/0044452 A1 | 3/2004 | Bauer et al. | 701/33 |
| 2004/0164706 A1 | 8/2004 | Osborne | 320/116 |
| 2005/0032404 A1 | 2/2005 | Furuta et al. | 439/157 |
| 2005/0138432 A1 | 6/2005 | Ransom et al. | 713/201 |
| 2005/0162172 A1 | 7/2005 | Bertness | 324/426 |
| 2006/0028171 A1 | 2/2006 | Marraffa | 320/107 |
| 2006/0149459 A1 | 7/2006 | Matsuura et al. | 701/201 |
| 2006/0185756 A1 | 8/2006 | Sato et al. | 141/94 |
| 2006/0229806 A1 | 10/2006 | Forlenza et al. | 701/207 |
| 2006/0277882 A1* | 12/2006 | Berger et al. | 56/10.2 J |
| 2007/0113921 A1 | 5/2007 | Capizzo | 141/231 |

| | | | | | | | |
|---|---|---|---|---|---|---|---|
| 2007/0241721 | A1 | 10/2007 | Weinstein et al. ............. 320/114 | FR | 2940638 | A3 | 7/2010 |
| 2008/0027639 | A1 | 1/2008 | Tryon | FR | 2943970 | A3 | 10/2010 |
| 2008/0052145 | A1 | 2/2008 | Kaplan et al. | GB | 1377729 | | 12/1974 |
| 2008/0203973 | A1 | 8/2008 | Gale et al. | GB | 2219151 | A | 11/1989 |
| 2008/0220958 | A1 | 9/2008 | Hayasaka et al. | GB | 2253379 | A | 9/1992 |
| 2008/0258682 | A1 | 10/2008 | Li ............................ 320/109 | JP | 2001-291530 | | 10/2001 |
| 2008/0315837 | A1 | 12/2008 | Elder et al. ................ 320/134 | JP | 2004-215468 | | 7/2004 |
| 2009/0011639 | A1 | 1/2009 | Ballard et al. ............... 439/607 | JP | 2004-331020 | | 11/2004 |
| 2009/0014224 | A1 | 1/2009 | Rydberg et al. | JP | 2006-113892 | | 4/2006 |
| 2009/0021358 | A1 | 1/2009 | Lee et al. | JP | 2005-238969 | | 9/2006 |
| 2009/0024232 | A1 | 1/2009 | Dickinson et al. ............ 700/89 | JP | 2006-331405 | | 12/2006 |
| 2009/0030712 | A1 | 1/2009 | Bogolea et al. | JP | 2008-056400 | | 3/2008 |
| 2009/0043519 | A1 | 2/2009 | Bridges et al. | JP | 2011-208287 | | 10/2011 |
| 2009/0043520 | A1 | 2/2009 | Pollack et al. | WO | WO 93/02887 | A1 | 2/1993 |
| 2009/0058355 | A1 | 3/2009 | Meyer | WO | WO 93/08629 | A1 | 4/1993 |
| 2009/0082957 | A1 | 3/2009 | Agassi et al. | WO | WO 93/08630 | A1 | 4/1993 |
| 2009/0091291 | A1 | 4/2009 | Woody et al. | WO | WO 94/09544 | A1 | 4/1994 |
| 2009/0174365 | A1 | 7/2009 | Lowenthal et al. | WO | WO 94/11853 | A1 | 5/1994 |
| 2009/0184689 | A1 | 7/2009 | Kressner et al. | WO | WO 94/26002 | A1 | 11/1994 |
| 2009/0216387 | A1 | 8/2009 | Klein | WO | WO 94/28526 | A1 | 12/1994 |
| 2009/0312903 | A1 | 12/2009 | Hafner et al. | WO | WO 96/01520 | A1 | 1/1996 |
| 2009/0313032 | A1 | 12/2009 | Hafner et al. | WO | WO 98/21132 | | 5/1998 |
| 2009/0313033 | A1 | 12/2009 | Hafner et al. | WO | WO 2008/073453 | A1 | 6/2008 |
| 2009/0313034 | A1 | 12/2009 | Ferro et al. | WO | WO 2008/073470 | A2 | 6/2008 |
| 2009/0313098 | A1 | 12/2009 | Hafner et al. | WO | WO 2008/073472 | A2 | 6/2008 |
| 2009/0313103 | A1 | 12/2009 | Ambrosio et al. | WO | WO 2008/073474 | A2 | 6/2008 |
| 2009/0313104 | A1 | 12/2009 | Hafner et al. | WO | WO 2008/073476 | A2 | 6/2008 |
| 2009/0327165 | A1 | 12/2009 | Kaufman | WO | WO 2008/073477 | A2 | 6/2008 |
| 2010/0019718 | A1 | 1/2010 | Salasoo et al. | WO | WO 2009/109826 | A1 | 9/2009 |
| 2010/0019726 | A1 | 1/2010 | Kumar | WO | WO 2009/156780 | A1 | 12/2009 |
| 2010/0049533 | A1 | 2/2010 | Ferro et al. | WO | WO 2010/004192 | A2 | 1/2010 |
| 2010/0049610 | A1 | 2/2010 | Ambrosio et al. | WO | WO 2010/015777 | A1 | 2/2010 |
| 2010/0065627 | A1 | 3/2010 | Outwater | WO | WO 2010/040931 | A2 | 4/2010 |
| 2010/0082464 | A1 | 4/2010 | Keefe | WO | WO 2010/076457 | A1 | 7/2010 |
| 2010/0114798 | A1 | 5/2010 | Sirton | WO | WO 2010/094892 | A1 | 8/2010 |
| 2010/0134067 | A1 | 6/2010 | Baxter et al. | WO | WO 2010/094898 | A1 | 8/2010 |
| 2010/0145717 | A1* | 6/2010 | Hoeltzel .................... 705/1.1 | WO | WO 2010/122266 | A1 | 10/2010 |
| 2010/0145837 | A1 | 6/2010 | Graziano et al. | WO | WO 2010/122267 | A2 | 10/2010 |
| 2010/0161469 | A1 | 6/2010 | Littrell | WO | WO 2010/124831 | A2 | 11/2010 |
| 2010/0161483 | A1 | 6/2010 | Littrell | WO | WO 2010/150665 | A1 | 12/2010 |
| 2010/0237985 | A1 | 9/2010 | Landau-Holdsworth et al. | WO | WO 2011/012601 | A2 | 2/2011 |
| 2010/0280702 | A1 | 11/2010 | Artus ........................... 701/30 | WO | WO 2011/058253 | A1 | 5/2011 |
| 2010/0286938 | A1 | 11/2010 | Kaneko ........................ 702/63 | WO | WO 2011/058256 | A1 | 5/2011 |
| 2011/0050164 | A1 | 3/2011 | Partovi et al. | WO | WO 2011/128765 | A2 | 10/2011 |
| 2011/0066515 | A1 | 3/2011 | Horvath et al. | | | | |

FOREIGN PATENT DOCUMENTS

| | | |
|---|---|---|
| DE | 3439038 A1 | 4/1986 |
| DE | 4120060 A1 | 12/1992 |
| DE | 10338279 A1 | 3/2005 |
| EP | 0047089 A1 | 3/1982 |
| EP | 0233638 A2 | 8/1987 |
| EP | 0476405 A1 | 3/1992 |
| EP | 0548748 A1 | 6/1993 |
| EP | 0551080 A2 | 7/1993 |
| EP | 0575864 A2 | 12/1993 |
| EP | 0599528 A2 | 6/1994 |
| EP | 0644625 A2 | 3/1995 |
| EP | 0692849 A1 | 1/1996 |
| EP | 0769218 A1 | 4/1997 |
| EP | 1170609 A2 | 1/2002 |
| EP | 1275936 A2 | 1/2003 |
| FR | 2685547 A1 | 6/1993 |
| FR | 2696139 A1 | 4/1994 |
| FR | 2721559 A1 | 12/1995 |
| FR | 2737694 A1 | 2/1997 |

OTHER PUBLICATIONS

International Search Report and Written Opinion issued in PCT/US2009/057596 on Dec. 30, 2009, 10 pages by ISA/EP.

International Search Report and Written Opinion issued in PCT/US2009/057594 on Dec. 16, 2009, 10 pages by ISA/EP.

Heavy Duty Connectors, May 13, 2010, 5 pgs. www.weidmuller.com (http://www.weidmuller.com).

International Preliminary Examination Report for PCT/US08/77132 dated Feb. 22, 2010, 5 pgs.

International Search Report and Written Opinion for PCT/US2010/048661 dated Dec. 10, 2010, 9 pgs.

European Search Report EP 08832521 dated Feb. 2, 2011, 5 pgs.

Office Action, Australian Patent Application 2008302073, Jul. 21, 2011, 1 pg.

Office Action, Japanese Patent Application 2010-526033, Jun. 16, 2011, 4 pgs.

Better Place GmbH, European Search Report, EP Application 11189231.1, Dec. 23, 2011, 2 pgs.

* cited by examiner

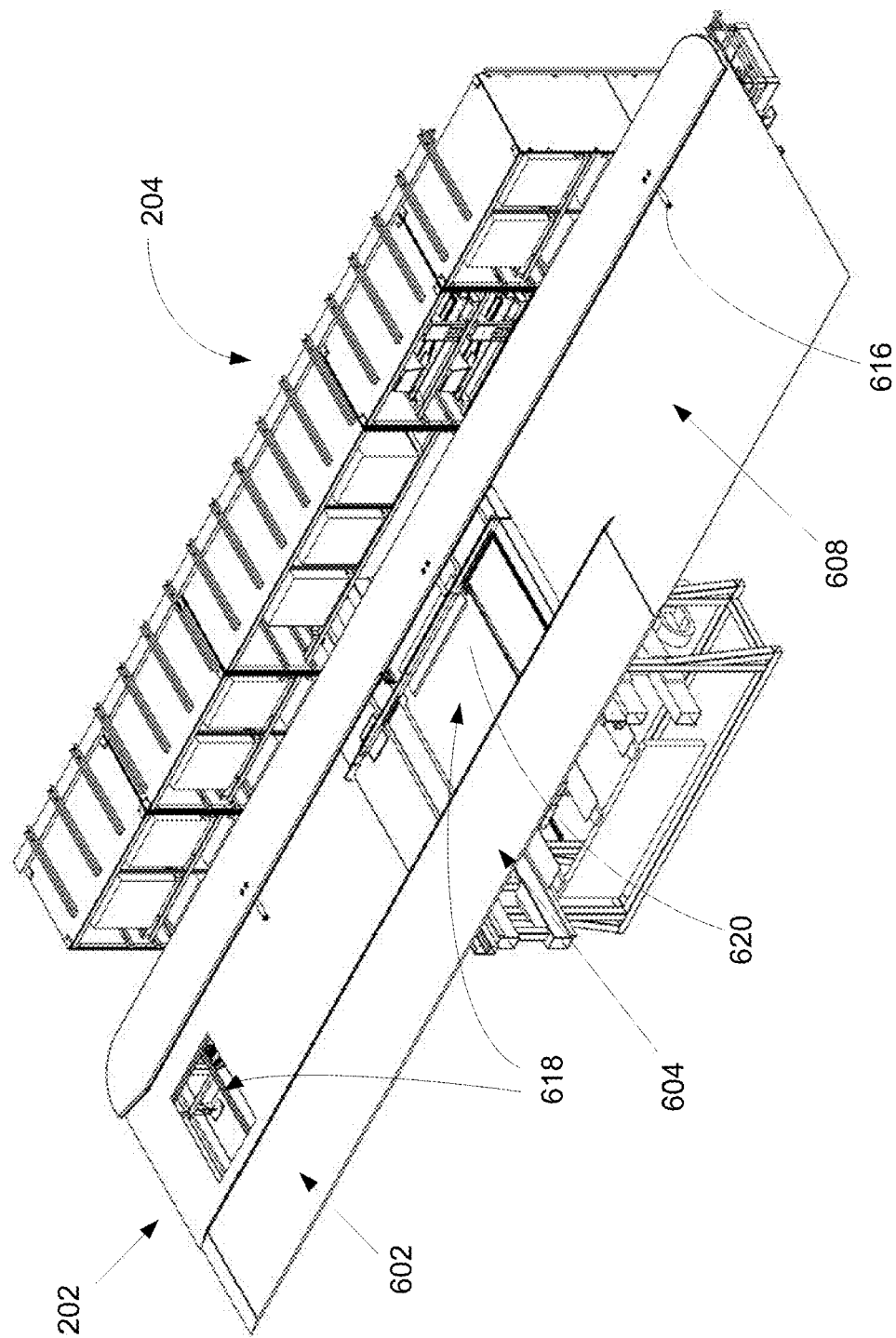

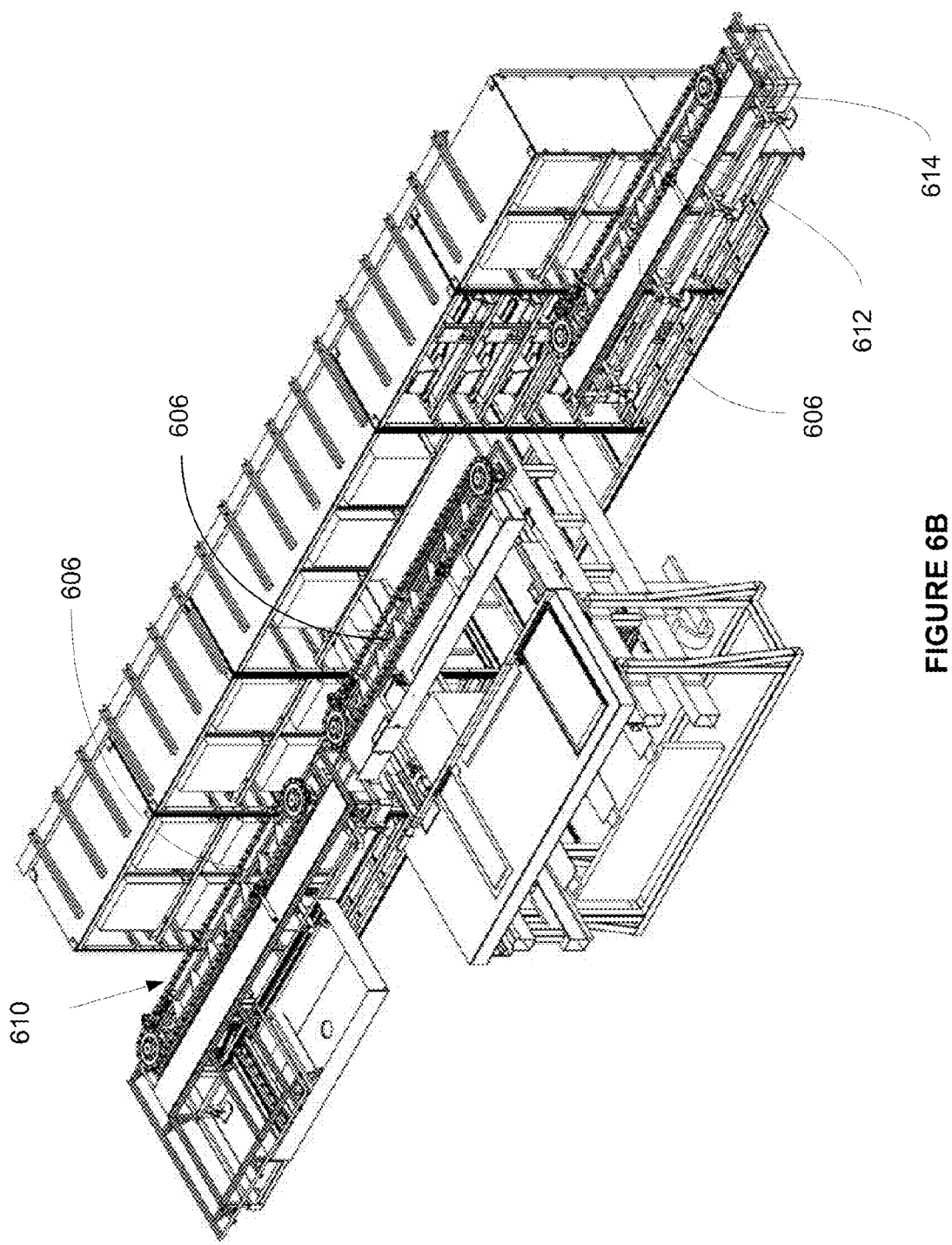

BATTERY EXCHANGE STATION

RELATED APPLICATIONS

This application claims the benefit of the following U.S. Provisional Patent Applications all of which are incorporated by reference herein in their entirety: U.S. Provisional Patent Application No. 61/166,239, filed Apr. 2, 2009, entitled "Battery Exchange Station"; U.S. Provisional Patent Application No. 61/206,913, filed Feb. 4, 2009, entitled "Battery exchange station"; U.S. Provisional Patent Application No. 61/149,690, filed Feb. 3, 2009, entitled "Battery Exchange Station"; and U.S. Provisional Patent Application No. 61/098,724, filed Sep. 19, 2008, entitled "Battery Bay and Battery Exchange Station."

FIELD OF THE INVENTION

The present invention relates generally to the field of electric cars with exchangeable batteries and more specifically relates to the exchange stations for swapping such electric batteries.

BACKGROUND OF THE INVENTION

The vehicle (e.g., cars, trucks, planes, boats, etc.) is an integral part of the modern economy. Unfortunately, fossil fuels, like oil, used to power automobiles have numerous drawbacks including: a dependence on limited foreign sources for these fossil fuels, pollution, and climate change. One solution to these problems is to increase the fuel economy of automobiles. Recently, gasoline-electric hybrid vehicles have been introduced, which have fuel economies that are substantially higher than the fuel economy of their traditional non-hybrid counterparts. However, hybrid vehicles do not eliminate the need for fossil fuels.

Another solution to these problems is to use clean engine technologies such as engines powered by fuel cells or batteries. However, many of these clean engine technologies are not yet practical. For example, fuel cell vehicle are still in the development stage and are expensive. Similarly, battery technology has not advanced to the point where batteries can power electric vehicles for long distances. Batteries are costly and may add as much as 40% to the cost of a vehicle. Furthermore, batteries can take many hours to recharge.

Accordingly, it would be highly desirable to provide a vehicle system that addresses the above described drawbacks.

SUMMARY

In order to overcome the above described drawbacks, a network of charge spots and battery exchange stations are deployed to provide the electric vehicle user with the ability to keep his or her vehicle charged and available for use at all times. Some embodiments provide a system and method to quickly exchange, a spent depleted (or substantially discharged) battery pack for a fully charged (or substantially fully charged) battery pack at a battery exchange station. The quick exchange is performed in a period of time significantly less than that required to recharge a battery, e.g., generally between forty seconds and five minutes. Thus, the long battery recharge time may no longer be relevant to a user of an electric vehicle who is traveling beyond the range of the battery. Since the electric vehicle is powered by a battery, the dependence on fossil fuels can be reduced, and the energy required to charge the battery can be generated by renewable and/or clean resources (e.g., solar power, wind power, hydroelectric power, etc.).

Furthermore, the cost of the electric vehicle can be substantially reduced because the battery of the electric vehicle can be separated from the initial cost of the vehicle. For example, the battery can be owned by a party other than the user of the vehicle, such as a financial institution or a service provider. These concepts are explained in more detail in U.S. patent application Ser. No. 12/234,591, filed Sep. 19, 2008, entitled Electronic Vehicle Network, incorporated herein by reference. Thus, the batteries may be treated as components of the electric recharge grid (ERG) infrastructure to be monetized over a long period of time, and not a part of the vehicle purchased by the consumer.

The following provides a detailed description of a system and method for swapping-out, exchanging, or replacing battery packs in electric vehicles. In order to exchange a spent battery for a charged battery, a battery exchange station is provided. Some embodiments provide a network of battery exchange stations that can exchange discharged batteries for charged batteries, and can charge the discharged batteries for insertion into another vehicle. The battery exchange station has various mechanisms to facilitate the exchange of old discharged batteries for new charged batteries. The same subsystems described herein for an exchange station can be assembled in different configurations to tailor make each exchange station to fit its local specific needs and constraints.

Some embodiments provide a sliding door system for providing access to an underside of a vehicle. The sliding door system includes: a door configured to slide in a first direction, and a conveyor system in the door configured to slide in a second direction opposite to the first direction while supporting at least one wheel of a vehicle.

In some embodiments, the door is slidably coupled to at least one rail. In some embodiments, the sliding door system is configured to couple to a service bay such that when the door slides it exposes an opening above the service bay. In some embodiments, the opening that is exposed is of variable size, and is sizable with respect to one or more of the vehicle's wheelbase or track. In some embodiments, the opening that is exposed is sized to receive a battery for the vehicle there through.

In some embodiments, the conveyor system is one or more conveyor belts each configured to support a distinct wheel. In some embodiments, the one or more conveyor belts include a first conveyor belt and a second conveyor belt. The first conveyor belt is larger than the second conveyor belt to support differently sized vehicles. In some embodiments, the one or more conveyor belts each have an upper supporting surface. The upper supporting surface is flush with the door. In some embodiments, the one or more conveyor belts are free to rotate without power.

In some embodiments, the sliding door system includes one or more electric motors, wherein each electric motor rotates a respective conveyor belt. In some embodiments, the one or more conveyor belts are configured to alter the yaw of the vehicle. In some embodiments, the conveyor system is one or more roller pads each for supporting a distinct wheel.

Some embodiments provide a method of servicing a vehicle. The method includes the following steps: providing a sliding door system comprising: a door; and a conveyor system in the door. The method further includes receiving a vehicle over the sliding door system such that at least one wheel of the vehicle rests on the conveyor system; and sliding the door in a first direction while allowing the conveyor system to slide in a second direction opposite to the first direction while supporting the at least one wheel, wherein the sliding of the door and the sliding of the conveyor system happen at least partially concurrently.

In some embodiments, the first direction is perpendicular to a longitudinal axis of the vehicle and parallel to an underside of the vehicle.

In some embodiments, the method also includes: providing a first guide positioned on the door adjacent to the conveyor system, and stopping the sliding when the at least one wheel contacts the first guide.

In some embodiments, the method also includes: providing a second guide positioned adjacent to the door; providing a second conveyor system positioned adjacent to the second guide remote from the door for supporting a second wheel; and allowing the second conveyor system to slide in the first direction translating the vehicle in the first direction until the second wheel contacts the second guide.

In some embodiments, the method also includes: providing a conveyor system and corresponding guide for each wheel of the vehicle; and altering the yaw of the vehicle by allowing each conveyor system to rotate until its respective wheel hits its corresponding guide.

In some embodiments, the method also includes: providing one or more rising supports, and lifting the vehicle on the one or more rising supports to alter the vehicle's roll and pitch.

Some embodiments provide a battery exchange station, comprising: a battery exchange system configured to: lower a first rechargeable battery from a cavity in an underside of an at least partially electric vehicle along a first axis substantially perpendicular to a plane formed by a bottom surface of the at least partially electric vehicle; and lift second rechargeable battery into the cavity in the underside of the at least partially electric vehicle along a second axis parallel to the first axis.

In some embodiments, the battery exchange station also includes a warehouse configured to charge a plurality of different sized rechargeable batteries.

In some embodiments, the battery exchange system of the battery exchange station includes: a shuttle slidably coupled to at least one rail; an exchange platform; and a hydraulic or scissor lift mechanism coupled between the shuttle and the exchange platform. In some embodiments, it further includes a gripper coupled to the exchange platform configured to temporarily fix the first and second rechargeable batteries to the battery exchange system. In some embodiments, the battery exchange system has at least three degrees of freedom. In some embodiments, the battery exchange system is located below ground when at a rest position. In other embodiments, the battery exchange system is located above ground when at a rest position.

In some embodiments, the battery exchange station further includes: an indexing system configured to measure alignment between the exchange platform and the cavity in the underside of the at least partially electric vehicle.

In some embodiments, the battery exchange system of the battery exchange station further includes: an unlocking mechanism configured to electronically activate a lock on the at least partially electric vehicle. In some embodiments, it includes an unlocking mechanism configured to mechanically activate a lock on the at least partially electric vehicle.

Some embodiments provide a method of exchanging a battery in an at least partially electric vehicle. The method includes: removing a first rechargeable battery from a cavity in an underside of an at least partially electric vehicle by lowering the first rechargeable battery along a first axis substantially perpendicular to a plane formed by a bottom surface of the at least partially electric vehicle; and inserting the second battery into the cavity in the underside of the at least partially electric vehicle by lifting the second battery along a second axis parallel to the first axis. In some embodiments, the first axis and the second axis are collinear.

In some embodiments, the method includes, prior to the inserting, retrieving the second battery from a battery charging warehouse, and temporarily storing the second battery in a standby location.

In some embodiments, the method includes, retrieving, with an automated robotic mechanism the second battery from a rack module inside the battery charging warehouse, and delivering the second battery from the automated robotic mechanism to a battery exchange system.

In some embodiments, the method includes, after the removing, moving the first rechargeable battery to a battery charging warehouse. In some embodiments, the method includes, prior to the removing, mechanically disengaging a lock attaching the first battery to the at least partially electric vehicle.

In some embodiments, the mechanically disengaging comprises: inserting a key into a lock on the at least partially electric vehicle; and retracting the key into the exchange platform.

In some embodiments, the method of exchanging happens in under five minutes.

In some embodiments, the method includes prior to the removing, cleaning at least a portion of the first battery.

In some embodiments, the removing occurs at a first location and the inserting occurs at a second location.

In some embodiments, the method includes prior to the removing, automatically translating the vehicle to a first location above a service bay; and after the inserting, automatically translating the vehicle to a second location distinct from the first location.

Some embodiments provide an expandable modular system of racks with a plurality of rack modules for charging batteries of different sizes. In some embodiments, a respective rack module is configured for charging at least two different sized batteries. In some embodiments, a plurality of rack modules includes first rack modules and second rack modules. The first rack modules are configured to charge batteries of a first size, and the second rack modules are configured to charge batteries of a second size different than the batteries of the first size. In some embodiments, a respective rack module includes a battery presence sensor for sensing when a respective battery is in place, one more battery locating features to enable positioning of the battery, and a connector actuator arm for removably coupling to the battery for charging. In some embodiments, the modular system of rack is entirely underground.

BRIEF DESCRIPTION OF THE DRAWINGS

For a better understanding of the aforementioned aspects of the invention as well as additional aspects and embodiments thereof, reference should be made to the Description of the Embodiments below, in conjunction with the following drawings. These drawings illustrate various portions of the battery exchange station. It should be understood that various embodiments besides those directly illustrated can be made to encompass the concepts of this invention.

FIG. 6A is a perspective cut away view of the swap lane and warehouse of a battery exchange station according to some embodiments.

FIG. 6B is a perspective cut away view of the swap lane and warehouse of a FIG. 6A.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, and components have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items.

The present invention is directed to an exchange station for electric vehicles. The exchange station removes at least partially discharged batteries from electric vehicles and replaces them with a least partially charged batteries. In some embodiments the station is fully automated, and the exchange process is fully automatic. A driver may wish to step out of the vehicle during the battery exchange process, and in such an instance the driver can wait in a waiting area until the exchange process is complete. In some embodiments, the waiting area has benches, entertainment options, informational videos, vending machines, bank machines, etc. The batteries will be exchanged in a minimal amount of time. In some embodiments the exchange process is performed in under five minutes. Still other embodiments perform the exchange in less than four minutes. Yet other in embodiments perform the exchange in less than one minute. Finally, in some embodiments, the exchange is performed in forty seconds.

Figure 1:
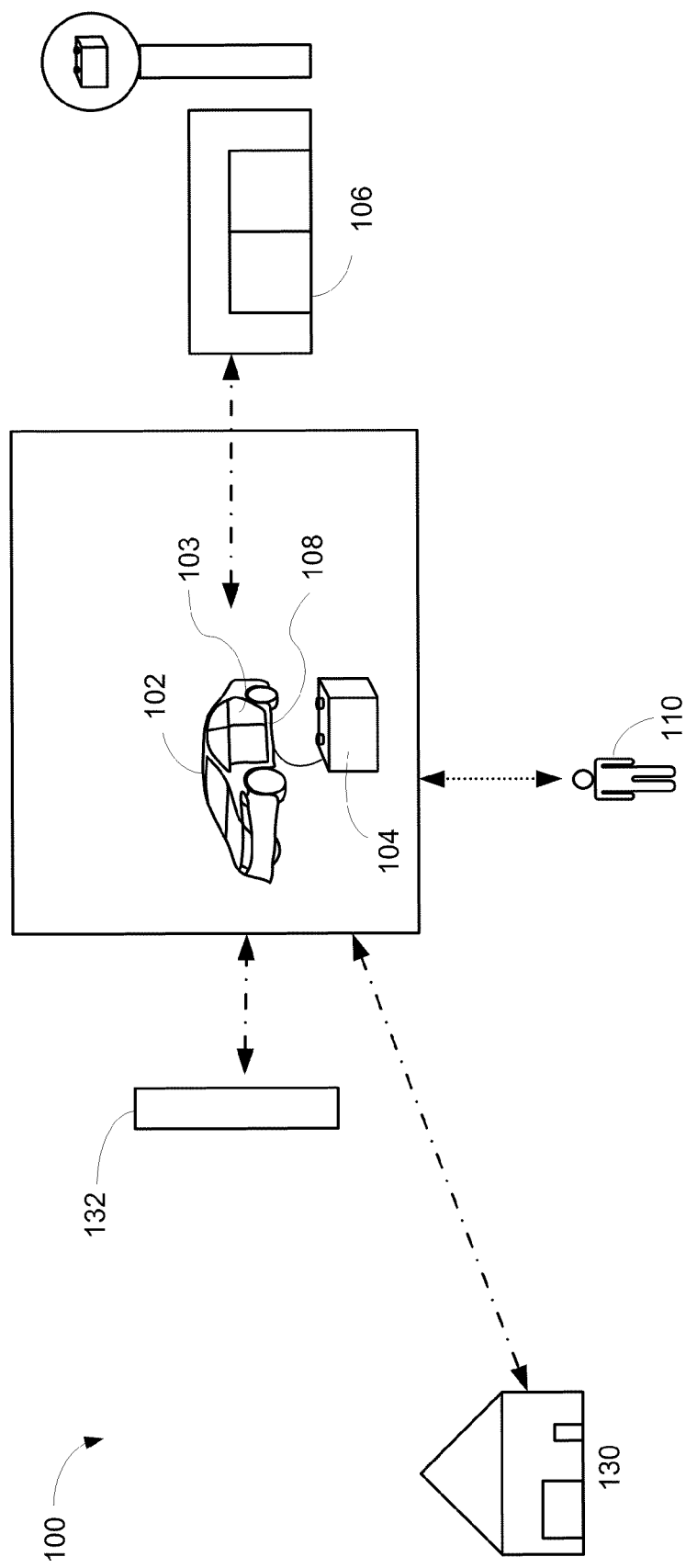
FIG. 1 illustrates an electric vehicle network, according to some embodiments.

FIG. 1 illustrates an electric vehicle network 100, according to some embodiments. The electric vehicle network 100 includes an at least partially electric vehicle 102 and a battery 104 configured to be removably coupled to the vehicle 102. In some embodiments, the battery 104 includes any device capable of storing electric energy such as batteries (e.g., lithium ion batteries, lead-acid batteries, nickel-metal hydride batteries, etc.), capacitors, reaction cells (e.g., Zn-air cell), etc. In some embodiments, the battery 104 includes a plurality of individual battery cells or chemical modules. In some embodiments, the battery 104 also includes cooling mechanisms, as well as mechanical and electrical connectors for connecting to the vehicle 102 or to the various elements of the battery exchange station 106.

In some embodiments, the vehicle 102 includes an electric motor 103 that drives one or more wheels of the vehicle. In these embodiments, the electric motor 103 receives energy from the battery 104 (shown separate from the vehicle for ease of explanation). The battery 104 of the vehicle 102 may be charged at a home 130 of a user 110 or at one or more charge stations 132. For example, a charge station 132 may be located in a shopping center parking lot. Furthermore, in some embodiments, the battery 104 of the vehicle 102 can be exchanged for a charged battery at one or more battery exchange stations 106. Thus, if a user is traveling a distance beyond the range of a single charge of the battery of the vehicle, the discharged (or partially discharged) battery can be exchanged for a charged (or partially charged) battery so that the user can continue with his/her travels without waiting for the original battery to be recharged. The relation of these components to related power and data networks are explained in more detail in U.S. patent application Ser. No. 12/234,591, filed Sep. 19, 2008, entitled Electronic Vehicle Network, the disclosure of which is incorporated herein by reference.

The exchange station 106 is made up of various components described in detail below. It should be noted that the exchange station 106 design is modular. As such, the same subsystems can be assembled in different configurations to tailor each station to fit its local specific needs and constraints. Furthermore, many of the exchange station 106 components are themselves modular such that they can support an expanding service station 106 brought about by an increased demand for services. For example, as explained with reference to FIGS. 11A and 11B below, the exchange station 106 can be reconfigured to accommodate more batteries 104 by adding racks or rack modules to the top of the existing warehouse.

Similarly, the automated robotic mechanism and the controlling software and hardware are designed to be easily reconfigured to service these additional batteries.

Figure 2:
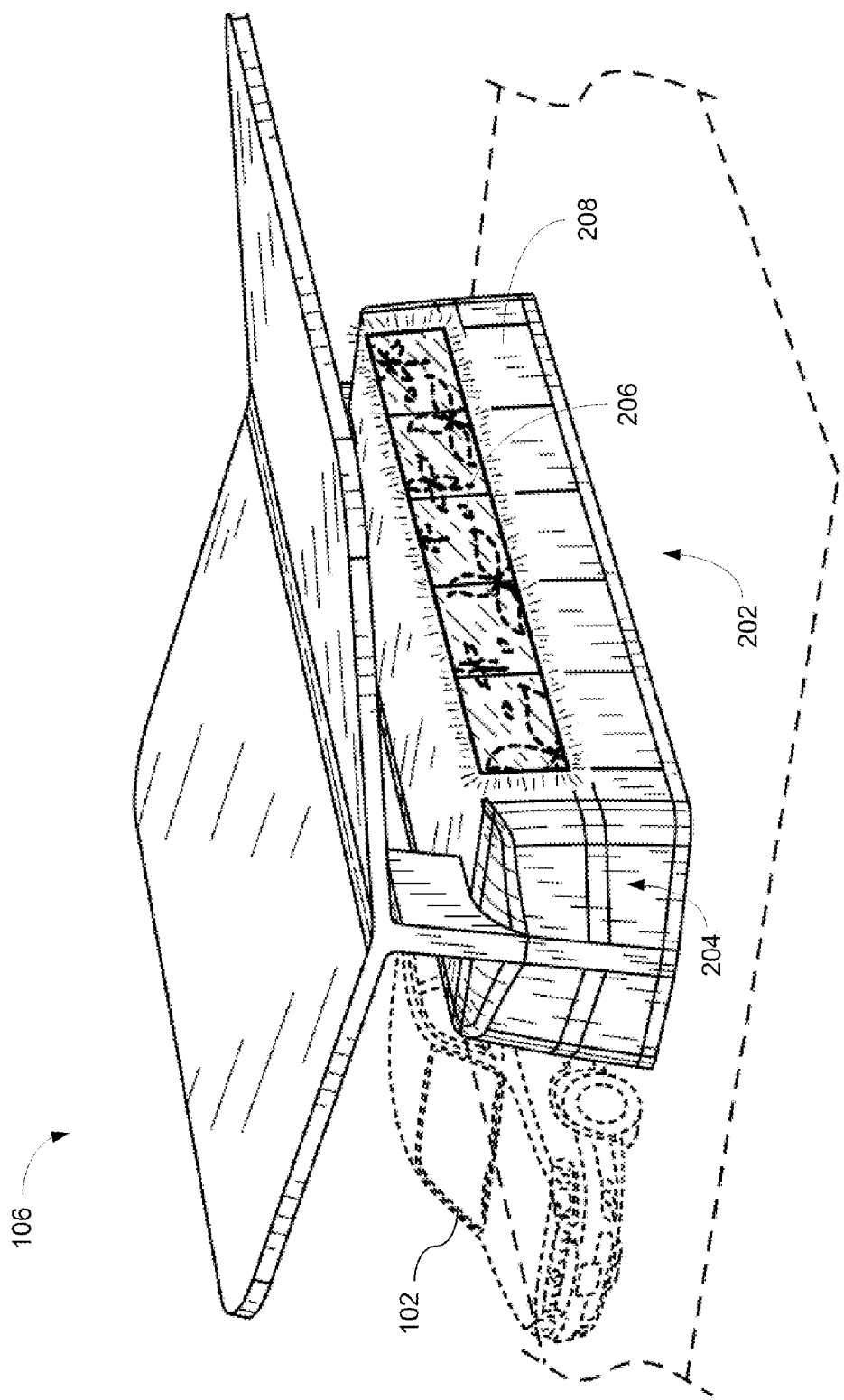
FIG. 2 is a perspective view of an embodiment of a battery exchange station.

FIG. 2 is a perspective view of an embodiment of the battery exchange station 106. As shown in FIG. 2, the battery exchange station 106 includes at least one swap lane 202 and a warehouse 204 for storing and charging batteries. The warehouse 204 is covered by an external skin 208 which protects the batteries and automation devices from weather abuse, crime and vandalism. The swap lane 202 is the area in the exchange station in which the electric vehicle 102 travels, from entrance to exit, and in which the electric vehicle undergoes several operations such as battery cleaning and battery exchange. A single building block of a battery exchange station 106 has at least one swap lane 202 with one station for exchanging a spent battery with a charged battery. The swap lanes 202 can be located in series or in parallel with respect to one another. In some embodiments the warehouse 204 is located in the middle of the exchange station 106 with a swap lane 202 on either side of it as illustrated in FIG. 2. In some embodiments, there are one or more swap lanes 202 on each side of the warehouse 204. In some embodiments, multiple swap lanes 202 exist in series one after the other. In some embodiments, multiple swap stations for exchanging a spent battery with a charged battery are serviced by a single cleaning station in a single swap lane 202. The battery exchange station 106 can be built in using underground swapping or above ground swapping.

When an electric vehicle 102 enters the battery exchange station 106 in some embodiments it encounters an entry gate (not shown) located at the entrance to the swap lane 202. The entry gate prevents un-sequenced or undesirable entry of vehicles 102 into the swap lane. The entry gate is also the location where a vehicle waits to enter the swap lane 202 when heavy traffic volume is encountered.

In some embodiments, the user 110 (FIG. 1) also encounters the driver interface 206 when first entering the battery exchange station. The driver interface 206 is a set of signal lights, displays, or audio devices which communicate with the user 110. An embodiment of a driver interface 206, shown in FIG. 2, is an animated display on a portion of the exterior wall of the warehouse 204. The driver interface 206 sends a set of instructions to the user 110 to instruct the user to safely engage his vehicle 102 with the station's automated devices. The driver interface 206 may also provide additional information to the driver(s) and passenger(s) regarding different services which are available at the battery exchange station. Some of the driver interfaces are installed inside the electric vehicle 102 and interact with the driver and passenger while they are in the vehicle 102. The electric vehicle 102 is allowed to proceed at the appropriate time, by obtaining signals from one or both of the gate and the driver interface 206 (internal to or external to the vehicle). In some embodiments, the driver pulls the vehicle forward. In other embodiments, the vehicle proceeds automatically under its own powers while controlled by a remote system. In still other embodiments the vehicle is moved by vehicle translation system 610 (discussed with respect to FIG. 6B).

Figure 3:
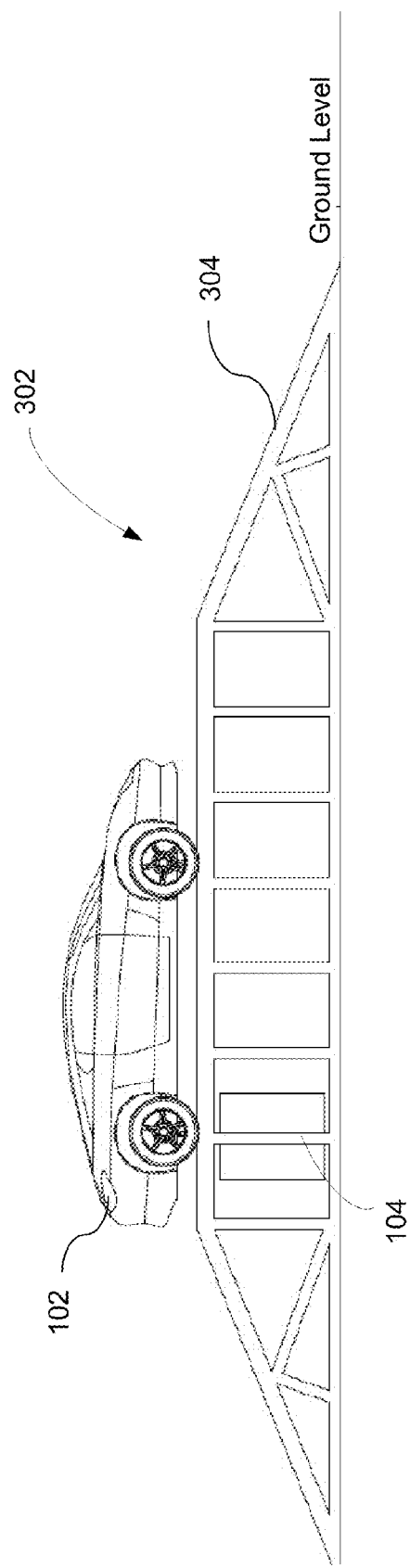
FIG. 3 is a cut-away side view of an embodiment of a battery exchange station where the exchange station swap lane is built above ground.

FIG. 3 shows an embodiment of the exchange station 106 having an above ground swap lane 302. As shown in FIG. 3, above ground swapping requires the vehicle 102 to be on an exchange ramp 304. In some embodiments, the user 110 drives the vehicle 102 onto the exchange ramp. In some embodiments, the vehicle is automatically translated onto the ramp 304 by a vehicle translation system 610 (discussed with respect to FIG. 6B). The above ground swap lane 302 requires less time to install than the below ground swap lane (discussed with respect to FIG. 4) because little or no underground excavation infrastructure is required. This type of above ground swap lane 302 is especially useful in locations where temporary battery exchange stations 106 are required.

Figure 4:
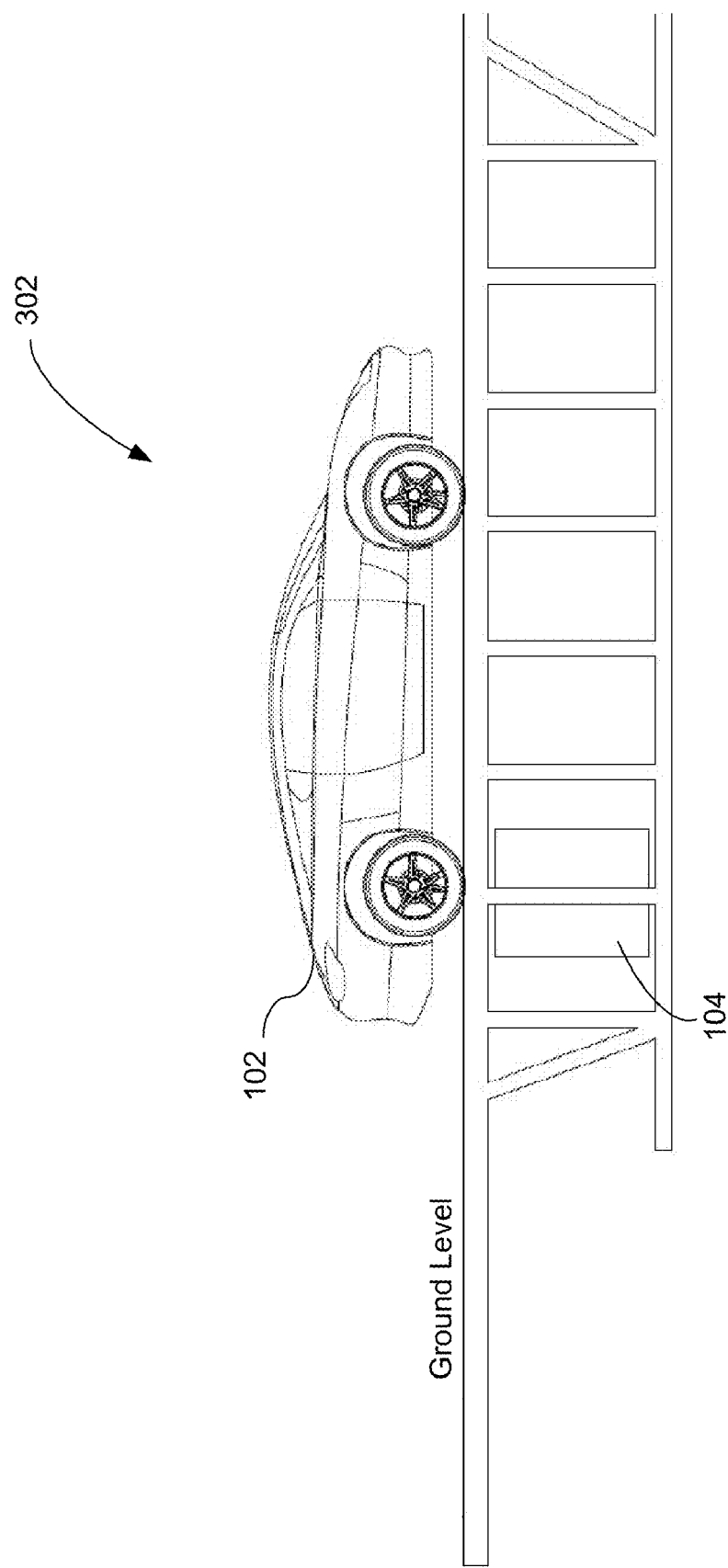
FIG. 4 is a cut-away side view of an embodiment of an exchange station where the exchange station swap lane is built at ground level.

FIG. 4 shows an embodiment of the exchange station 106 having a ground level swap lane 402. In this embodiment, the swapping mechanisms are buried below ground level. As shown in FIG. 4, underground swapping may allow for a more user friendly driver experience, where all the motion of the vehicle 102 throughout the station is done at ground level. The ground level swap lane 402 requires some underground excavation. For example one or more service bays 618 (discussed with respect to FIG. 6). In both the embodiments shown in FIGS. 3 and 4, the location of the swap lane with respect to the warehouse 202 of FIG. 2 can be altered if there are space constraints which are imposed at specific locations.

Figure 5A:
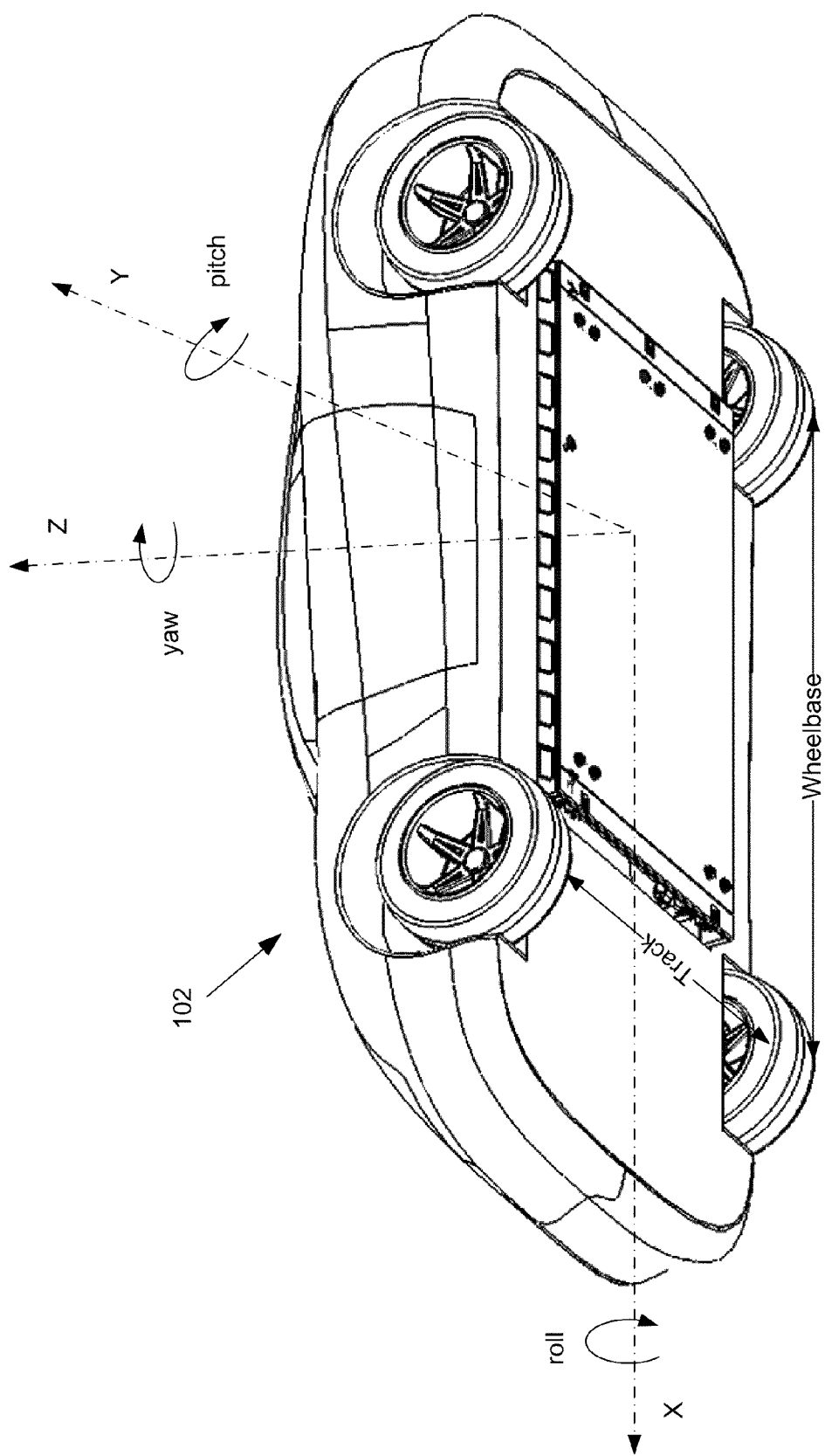
FIG. 5A is a perspective view of an electric vehicle with its battery inserted.
Figure 5B:
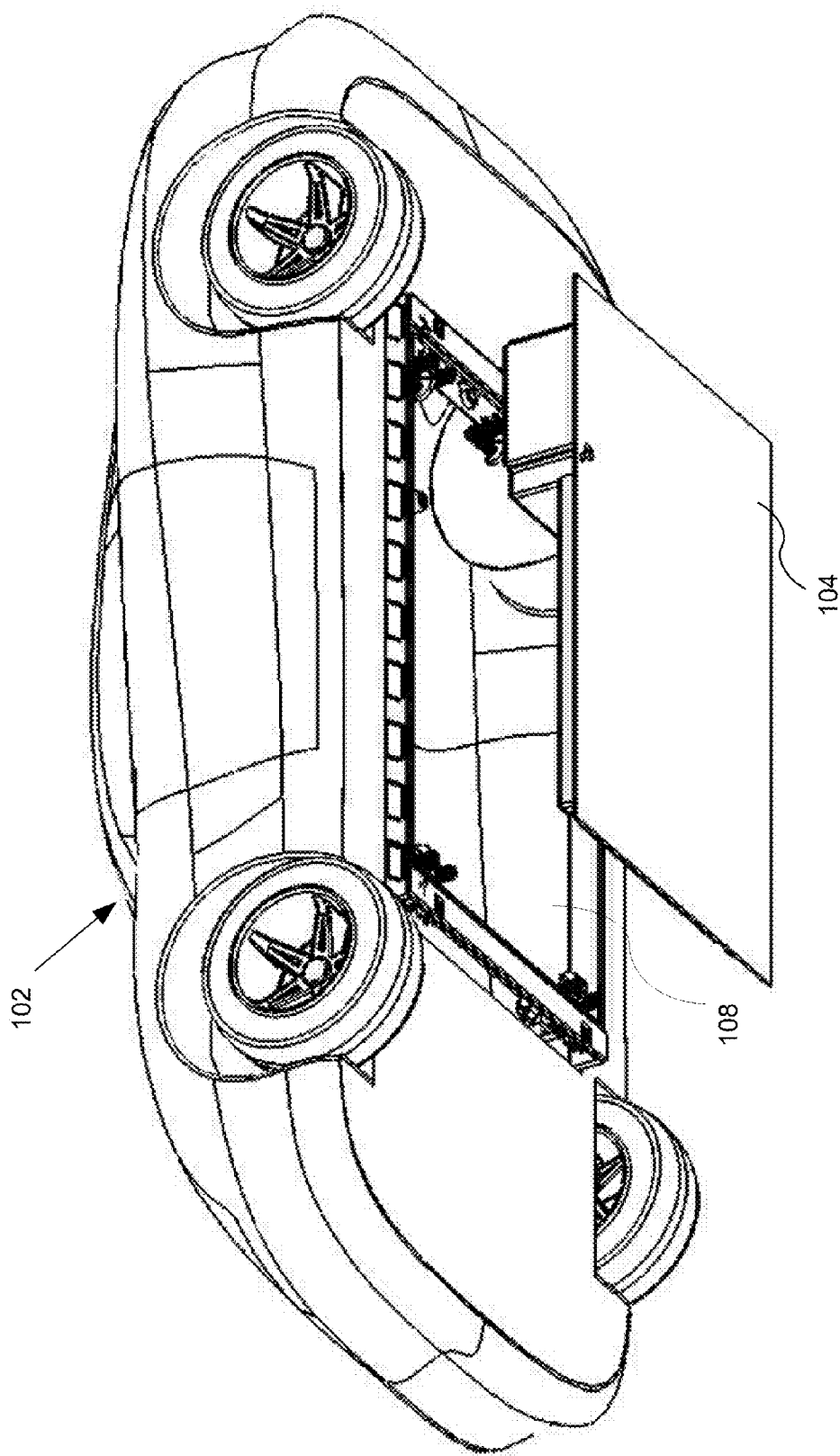
FIG. 5B is a perspective view of an electric vehicle with its battery partially removed.

FIGS. 5A and 5B are perspective views of an at least partially electric vehicle 102. FIG. 5A illustrates the battery 104 attached to the vehicle 102. FIG. 5B illustrates the battery 104 removed from the vehicle 102 such that the cavity 108 in the vehicle configured to house the battery 104 is visible. The embodiments described herein relate to the removal of an at least partially discharged battery 104 and the insertion of an at least partially charged battery 104 into the cavity 108 of the vehicle 102. In order to service different sized vehicles, these embodiments are capable of handling variations between vehicles of different sizes. These embodiments are also capable of handling linear and rotational misalignments between each vehicle and the various exchange station elements. FIG. 5A provides a defined coordinate system and vehicle dimensions which will be referenced in later discussions. FIG. 5A illustrates a coordinate system in which the X-axis parallel to the length of the vehicle from front to back, the Z-axis is parallel to the height of the vehicle from top to bottom, and the Y-axis is parallel to the width of the vehicle from one side to the other. The roll of the vehicle is its rotation about the X-axis. The yaw of the vehicle is its rotation about the Z-axis. The pitch of the vehicle is its rotation about the Y-axis. It should be noted that different types of vehicles have different lengths (along the X-axis) and consequently different wheelbases (the distance between the front rear wheels as shown.) Different vehicles also have different widths and consequently different tracks (the distance from one side wheel of the vehicle to the other as shown.) Furthermore, different vehicles have different tire sizes (diameter and width).

FIGS. 6A and 6B illustrate some elements of the swap lane 202 and warehouse 204. In some embodiments, the swap lane 202 includes several substations including a cleaning station 602, a swap station 604, a maintenance bay (not shown), or a waiting area 608. In some embodiments the vehicle 102 is carried along the swap lane 202 automatically by a vehicle translation system 610. As such, the vehicle 102 can be moved from one swap lane substation to another without the need of the driver of the vehicle to drive the vehicle 102 forward.

As shown in FIG. 6B, in some embodiments the vehicle translation system 610 includes several separate conveyors 606, for conveying the vehicle 102 through along the swap lane 202 to the substations that are positioned along the swap lane 202. FIG. 6B shows an embodiment of a swap lane 202 utilizing several conveyors 606 in series. In some embodiments, separate conveyors 606 for moving the vehicle to the proper position in the cleaning station 602, the swap station 604, and the waiting area 608 are provided. In some embodiments, only a subset of the conveyors 606 is used in the vehicle translation system 610. In some embodiments, one long conveyor carries the vehicle from the entrance of the swap lane 202 to its exit.

Although not shown, in some embodiments, a separate conveyor system 606 is used to evacuate a vehicle 102 to the maintenance bay area in the case of a failure in the battery exchange process or other vehicle malfunction. At the maintenance bay, a trouble-shooting procedure is initiated and in some cases a replacement vehicle 102 is supplied to the user 110.

In some embodiments, the vehicle translation system 610 can also convey a vehicle 102, which completed its battery exchange process, to the waiting area 608 if its driver left the vehicle 102 at the entrance to the station and the driver does not return to collect it. In such manner, the exit of the swap lane 202 will not be blocked by vehicles whose drivers are not in the driver's seat or immediately available to collect the vehicle.

Each conveyor system 606 includes a drive motor (not shown) and a drive chain 612 which is wrapped around fixed gears 614 on either end. In some embodiments, a "ski lift" style conveyer uses a vehicle translation element 616 such as a T-bar which makes contact with a wheel of the vehicle and pushes the vehicle 102 forward. In some embodiments, there are three separate conveyor systems for moving the vehicle 102 forward. The first conveyor system's vehicle translation element 616 makes contact with the back wheel of the vehicle and pushes the vehicle 102 into the cleaning station 602. The second conveyor system's vehicle translation element 616 makes contact with the front wheel of the vehicle 102 and pushes it into the swap station 604. After the exchange process is completed, the second conveyor then makes contact with the back wheel of the vehicle and pushes the vehicle 102 until the third conveyor system's vehicle translation element 616 makes contact with the vehicle's front wheel and pushes the vehicle 102 to a waiting area 608.

In some embodiments, the swap lane 202 includes a cleaning station 602 and/or a swap station 604 which are each housed in their own service bays 618. In some embodiments, openings 620 are exposed in the service bays 618 by sliding door systems (discussed with respect to FIGS. 7A and 7B.) In some embodiments, a service bay 618 houses a cleaning station 602. In some embodiments, the vehicle is cleaned at the cleaning station 602 before it enters the swap station 604 so that the discharged battery is easier to remove and so that much of the dirt and debris on the discharged battery does not enter the swap station 604 or warehouse 204. At the cleaning station 602, the bottom surface of the vehicle 102 and the battery 104 are cleaned from dirt, mud, ice salt and other debris which may be present on the bottom section of the battery 104. In some embodiments, the components of a cleaning station include one or more of the following: brushes, sponges, water jets, an air knife, an air blower, or frozen carbon dioxide droplet blasting. In some embodiments instead of a sliding door system, a perforated screen is used at the cleaning station 602 which allows cleaning fluids to be sprayed on the bottom of the vehicle 102 and battery 104 and allows air to be blown on the battery 104 to dry it. In some embodiments, frozen carbon dioxide droplets are blasted against the vehicle and battery to dispose of any dirt or debris, and thus no drying is required.

Figure 7A:
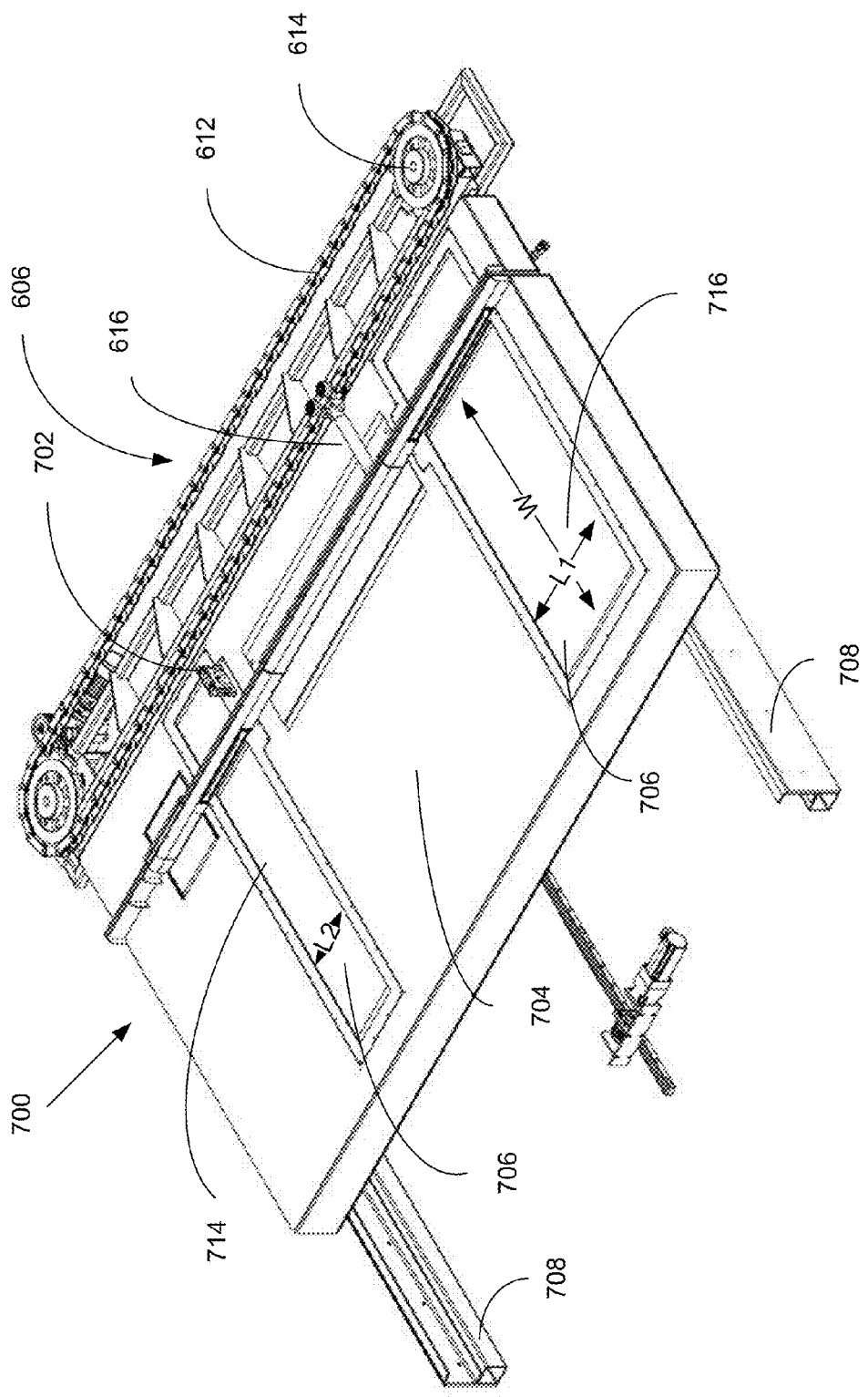
FIG. 7A is a perspective view of a sliding door system that is in a closed position.
Figure 7B:
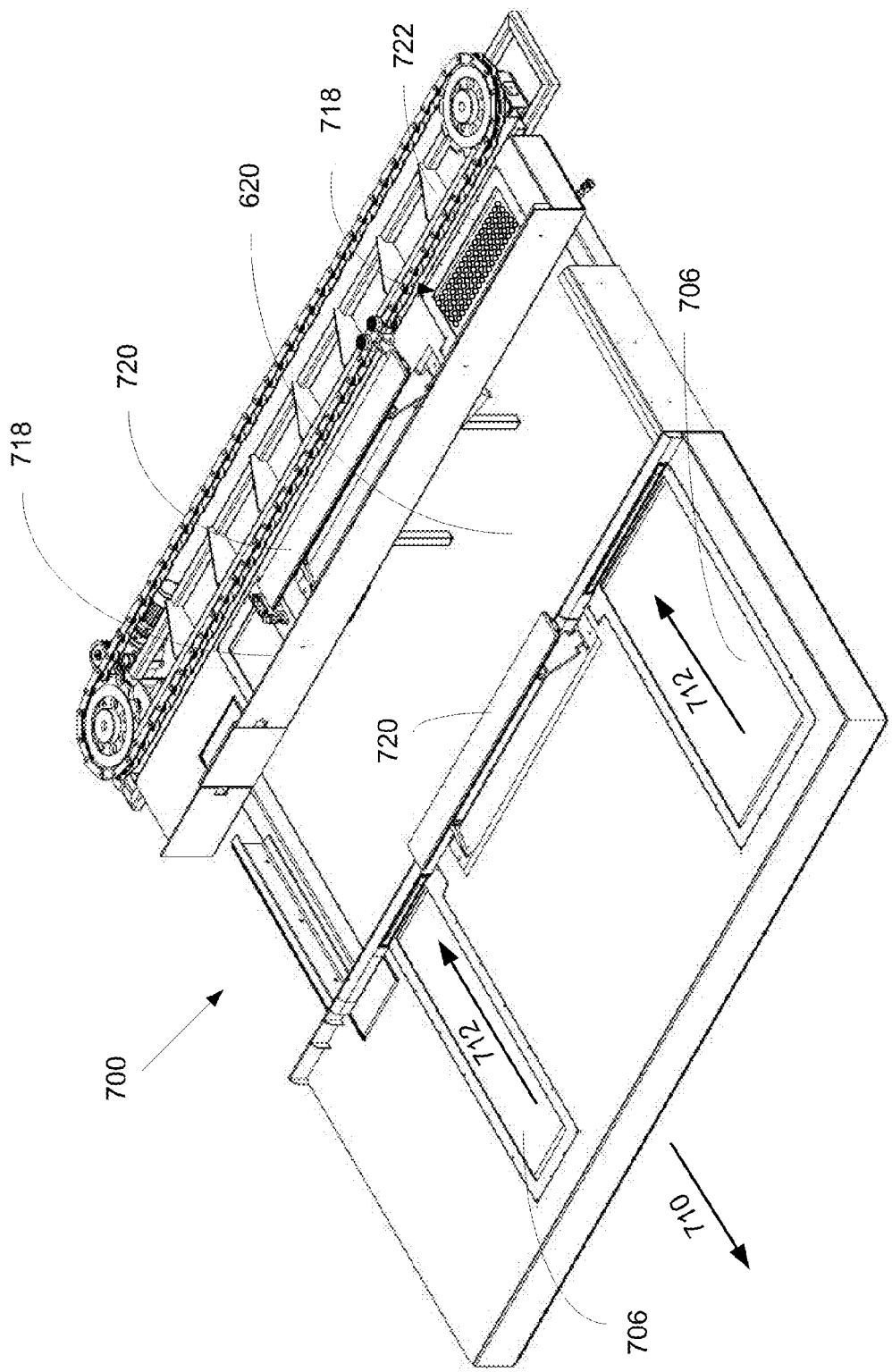
FIG. 7B is a perspective view of the sliding door system of FIG. 7A that is in an open position.

FIGS. 7A and 7B are perspective views of a sliding door system 700 in an open and a closed position. This sliding door system 700 includes a door 704 with at least one conveyor system 706 in the door 704. In some embodiments, the sliding door system 700 can be used in the swap station 604, the cleaning station 602, and/or the maintenance bay. The sliding door system 700 is configured to couple to a service bay 618 and expose an opening 620 above the service bay 618. In this embodiment the sliding door system 700 will be discussed with relation to the swap station 604. As explained above, in some embodiments, the vehicle 102 is translated to the swap station 604 by a conveyor 606 of the vehicle translation system 610. Specifically, as shown in FIG. 7A, the conveyor 606 includes a vehicle translation element 616 attached to a chain 612 which is wrapped around fixed gears 614 on either end. The vehicle 102 is stopped by a wheel stopping unit 702 located adjacent to a conveyor system 706 or 718. In some embodiments, the wheel stopping unit 702 is designed to stop one of the vehicle rear wheels at a predetermined location above the conveyor system 706.

The opening 620 is designed to accommodate different sized vehicles 102 and batteries 104. Manufacturers of electric vehicles may maximize the volume available for batteries in order to maximize the capacity of electric energy carried onboard an electric vehicle 102. Due to this fact, larger vehicles may have larger batteries 104 than smaller vehicles would be capable of carrying. The swap station 604 sliding door system 700 must be large enough to accommodate the removal of even the largest size battery 104. It must also be small enough to ensure that a small vehicle 102 does not fall through the opening 620. One solution is to utilize a sliding door system 700 where the opening 620 varies according to the size of the vehicle 102.

FIGS. 7A and 7B illustrate an embodiment of a sliding door system 700 with two door conveyor systems 706. Other embodiments have only one door conveyor system 706. Each door conveyor system 706 is configured to support a different wheel of a vehicle 102. The door 704 is slidably coupled to at least one rail 708. When the door 704 slides open, as indicated by the arrow 710 in FIG. 7B, the upper supporting surface of the conveyor systems 706 slide in an opposite direction indicated by arrows 712 in FIG. 7B. Similarly, when the door 704 slides closed, the upper supporting surface conveyor systems 706 also slide in a direction opposite to the direction of the door 704 (i.e., the movement of the door 704 and the conveyor (s) 706 when closing is directly opposite to the opening direction arrows 710 and 712 respectively). Each door conveyor system 706 moves relative to the door 704 such that the each door conveyor system 706 supports a wheel of a vehicle 102 in a substantially stationary position despite the movement of the door 704. In some embodiments, the conveyor system 706 includes two rubber belts that slide over with rollers rotatably coupled to the door under the rubber belts. The rubber belts form a basic conveyer device, similar to a "walking sidewalk." In some embodiments, the belts surround and are supported by the rollers so that the lower surface of the belt is beneath the rollers and is housed inside or at the lower side of the door 704 while the upper surface of the conveyor belt(s) is substantially flush with the upper surface of the door 704. In some embodiments, the axis of the rollers are parallel to the direction of the swap lane 202. This allows the door 704 to slide with respect to the vehicle wheels in a direction perpendicular to the direction of the swap lane 202. The belts may also be supported by ball bearings or any suitable rotational mechanism. In some embodiments, the conveyor(s) 706 are the roller pad(s) 722 of ball bearings. As such, the belts or roller pads can slide in the plane formed by the surface of the door and/or pivot about the Z-axis so that the yaw of the vehicle may also be corrected by means of the sliding door 704 and conveyor system(s) 706.

As shown in FIGS. 7A and 7B, the width (W) of each door conveyor system 706 is somewhat smaller than the width of the door 704 this width is needed to provide support for the wheel(s) of the vehicle as the door opens and also supports vehicles with many different widths, specifically different sized tracks, i.e., the width between the wheels on the same axle. Furthermore, as shown in FIGS. 7A and 7B the length of the door conveyor systems 706 may vary. Some embodiments include a long conveyor system 716 (having a length L1) and a short conveyor system 714 (having a length L2). This combination of short conveyor system 714 a long conveyor system 716 allows vehicles with longer wheel bases to use the same sliding door system 700 as vehicles with shorter wheel bases. Since a first wheel (the rear wheel in this embodiment) is stopped by the wheel stopping unit 702 that wheel will stop in approximately the same position no matter how large the vehicle is, and as such any sized vehicle will have one wheel supported by a short conveyor system 704. The other wheels however, will be located on different portions of the long conveyor system 716 depending on the length and specifically the wheel base of the vehicle 102. Longer vehicles will have a wheel positioned on a portion of the long conveyor system 716 further from the narrow conveyor system 714 and shorter vehicles will have their wheel positioned on a portion of the long conveyor system 716 closer to the narrow conveyor system 714.

Figure 8A:
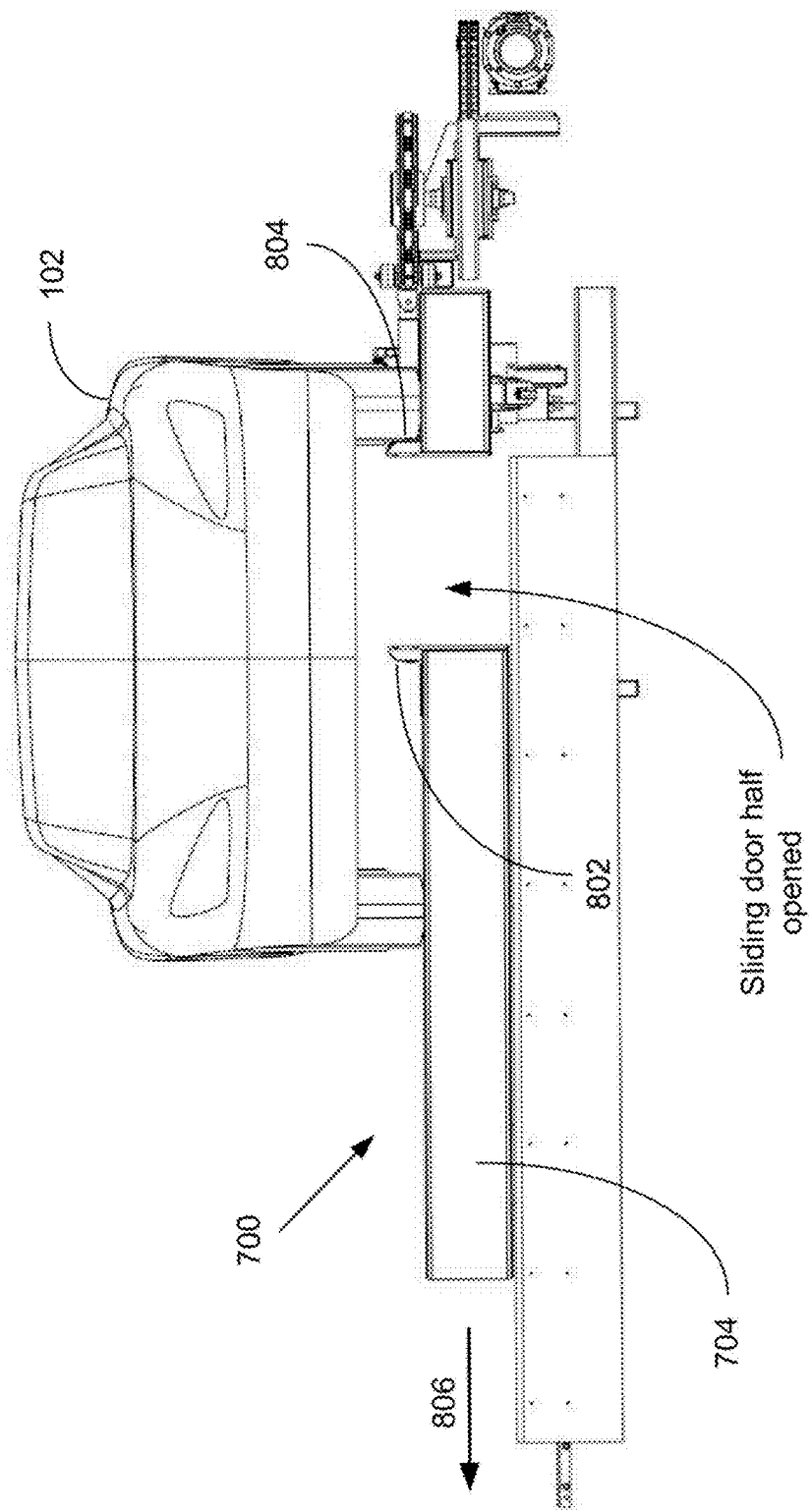
FIG. 8A is a front cut away view of a vehicle supported on a swap station sliding door that is in a partially open position.
Figure 8B:
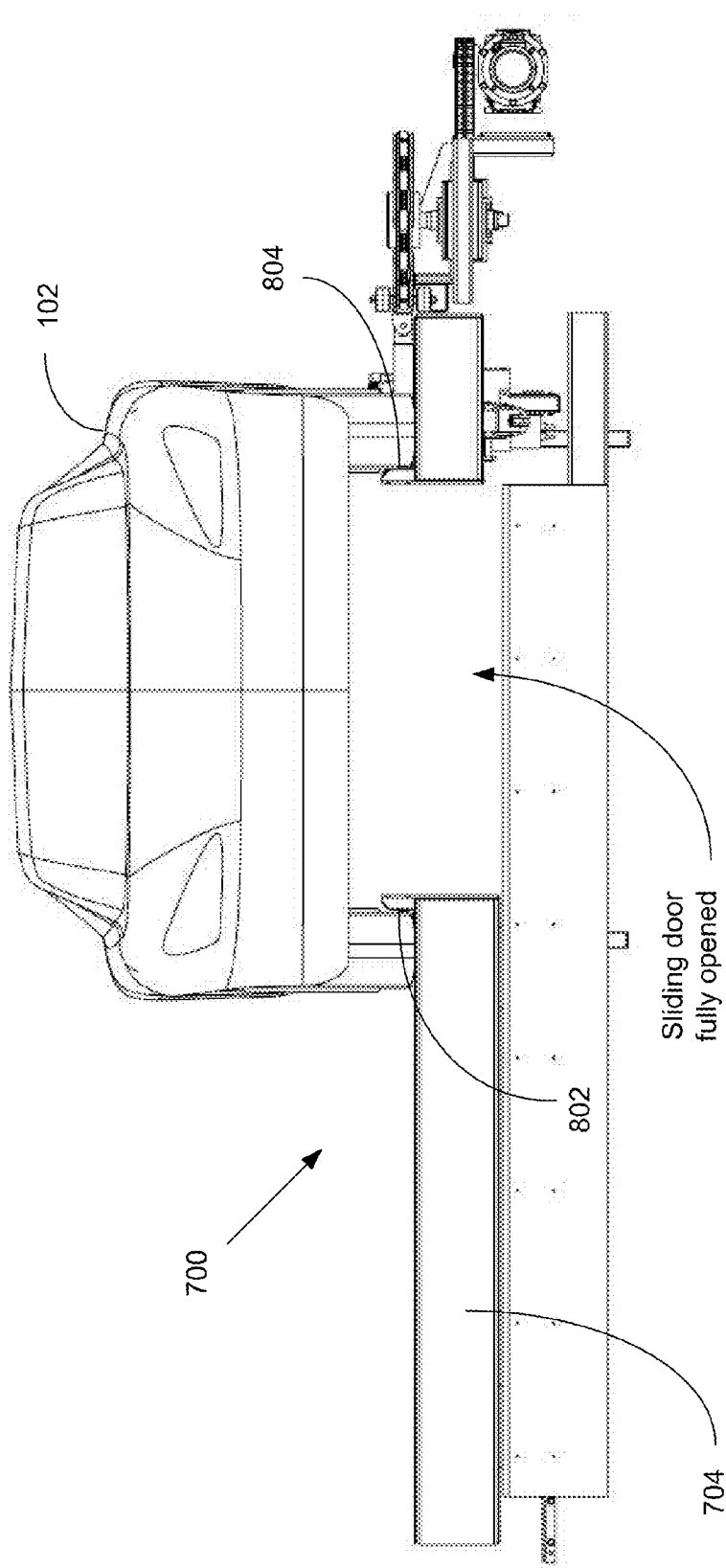
FIG. 8B is a front cut away view of a vehicle supported on a swap station sliding door that is in a fully open position.

FIGS. 8A and 8B are side views illustrating the opening of the sliding door system 700. Once the vehicle 102 is moved into a position where its wheel(s) are supported on the conveyor system(s) 706, the swap station door 704 opens as shown by arrow 806 in FIG. 8A. The door 704 opens until the wheel(s) supported by the conveyor system(s) 706 make contact with guide(s) 802 on the sliding door. As shown in FIGS. 8A and 8B, in some embodiments, the door opens in a direction perpendicular to the driving direction of the vehicle. As such, the guide(s) 802 will contact a side wall of the wheel. In other embodiments, the orientation of the sliding may be parallel to the driving direction of the vehicle. However, in most cases the direction of the sliding will be perpendicular to a longitudinal axis of the vehicle (perpendicular to the Z-axis of FIG. 5A.)

Returning to FIGS. 7A and 7B, in some embodiments, the sliding door system 700 also includes additional conveyor system(s) 718 not located in the door 704. The additional conveyor system(s) 718 are located adjacent to the door 704. These additional conveyor systems 718 may have the same characteristics and dimensions discussed above with the door conveyor systems 706, except that they are not as wide. The additional conveyor system(s) 718 are each configured to support a different wheel than the door conveyor systems 706. Between each additional conveyor system 718 and the door 704 is an additional guide 804, called a static guide because it does not move with the sliding door 704. When the siding door system 700 opens by sliding the door 704 in a first direction shown by arrow 806, the supporting surface(s) of the door conveyor system(s) 706 do not immediately begin to move in a direction opposite from the door 704. Instead, the door 704 pulls the vehicle 102 along with it while the supporting surface(s) of the additional conveyor system(s) 718 slide in the same direction as the door and 718 until the vehicle's wheels on the side opposite to the side supported by the sliding door 704 are contact the static guide(s) 804. Then the sliding door 704 continues to open while upper surface(s) of the door conveyor system(s) 706 slide in a direction opposite the direction of the door until wheels on the other side of the vehicle are stopped against the guide 802 on the sliding door. In some embodiments, the sliding door guide(s) 802 and the static guide(s) 804 are equipped with pressure sensors. These sensors allow a control system to stop the door 704 from further opening action once the wheels come in contact with the sliding door guides 802.

In some embodiments, this dual conveyor system design, having one or more door conveyor systems 706 and one or more additional conveyor systems 718 not in the door, allows the automakers to expose an opening 620 in a service bay 618 of variable size. The size of the opening 620 is sized with respect to the vehicle's track or wheelbase depending on whether the door 704 slides to the side of the vehicle 102 as shown in FIGS. 8A and 8B (along an axis parallel to the Y-axis of FIG. 5A) or to the front or back of the vehicle (along an axis parallel to the X-axis of FIG. 5A). This dual conveyor system can maximize the access area under the vehicle to as wide as the distance between the vehicle wheels, because the door 704 opens until the area between the wheels is substantially completely exposed. In such a way, almost the entire width of the underside of the vehicle 102 is exposed (except for the width of the wheels.) As such, the opening 620 is generously sized to translate a battery 104 there through.

It should be noted that the sides of a vehicle 102 serve as a crimping zone that absorbs side impact energy to protect the passengers, and as such are generally not used to accommodate the battery 104. Thus, opening the door 704 any further than the wheels is unnecessary as batteries may not be sized larger than the width between the wheels. It should also be noted that a variable sized opening 620 can also be achieved with only the door conveyor system(s) 706, although a slightly larger opening is achieved by utilizing the dual conveyor system design.

In some embodiments, the conveyor systems 706, 718 are configured to be passive, i.e., they are free to rotate without power. In other embodiments, the conveyor systems 706, 718 are coupled to one or more electric motors which move the conveyor systems 706, 718. In some embodiments, each conveyor system 706, 718 is actuated by a separate electric motor. Separate actuation of each conveyor system is used to correct any misalignment in the vehicle's yaw. In some embodiments, the swap station sliding door 704 slides underneath a covered area. This allows individuals to walk near the vehicle 102 during the exchange process without interfering with the sliding door system 700. The covered area also keeps the door 704 clean and protected during operation.

Once the door 704 of the sliding door system 700 is opened the vehicle is prepared for the battery exchange process. Each individual vehicle 102 that travels into the exchange station 106 has slightly different alignment of yaw, pitch, and roll orientation as shown in FIG. 5. The yaw misalignment is due to the vehicle 102 not entering an area above the service bay 618 in exact alignment with the direction of the swap lane 202. In some embodiments, the yaw of the vehicle 102 is corrected by positioning the vehicle wheels using the sliding door 704 and conveyor system(s) (706 or 706 and 718), as explained above. The roll and the pitch of the vehicle may be a result of different vehicle weight bias, pressure in the vehicle wheels, weight of the vehicle and vehicle suspensions settings. In some embodiments, the roll and the pitch of the vehicle is addressed by two rising supports 720 shown in FIGS. 7A and 7B. The supports 720 are located one on the sliding door 704 and one near the static guide 804. The two rising supports 720 are located near the guides 802 and 804, and therefore they are typically located under the vehicle body side structural beams, between the rear and the front wheels no matter what size the vehicle is because the sliding door guides 802 and 804 allow the swap station door 704 to open substantially all the way to the interior sides of the vehicle's wheels. The rising supports 720 rise slightly, high enough to compensate for any suspension or tire sag due to a weight similar to or greater than the weight of the battery 104. The rising supports 720 rise to a predetermined height, and as such the vehicle 104 is slightly raised and its roll and pitch angles are corrected. In this manner, the vehicle coordinate system is positioned in parallel to a swap lane coordinate system. Misalignment of yaw, pitch, and roll of the vehicle, with respect to the swap lane is minimized using these mechanisms. The location of the vehicle in the horizontal plane (X-Z plane of FIG. 5) is set (achieved by the vehicle wheel stopping units 802 and 804), and the elevation of the vehicle above ground is set at a predetermined height (achieved by the rising supports 720). Alternately, the battery 104 and battery exchange system 1300 (explained with respect to FIG. 13) may accommodate misalignment. The battery exchange process can now commence since the location of the vehicle 102, and consequently its battery bay 108 and its battery 104 is fully defined.

During or before the vehicle alignment process, discussed above, other subunits of the battery exchange station 106 prepares an appropriately sized charged battery 104 to be inserted into the vehicle 102. Part of this process utilizes a mechanism in the warehouse 204 (explained with respect to FIG. 9) and part of this process utilizes the battery exchange system 1300 (Explained with respect to FIG. 13.)

Figure 9:
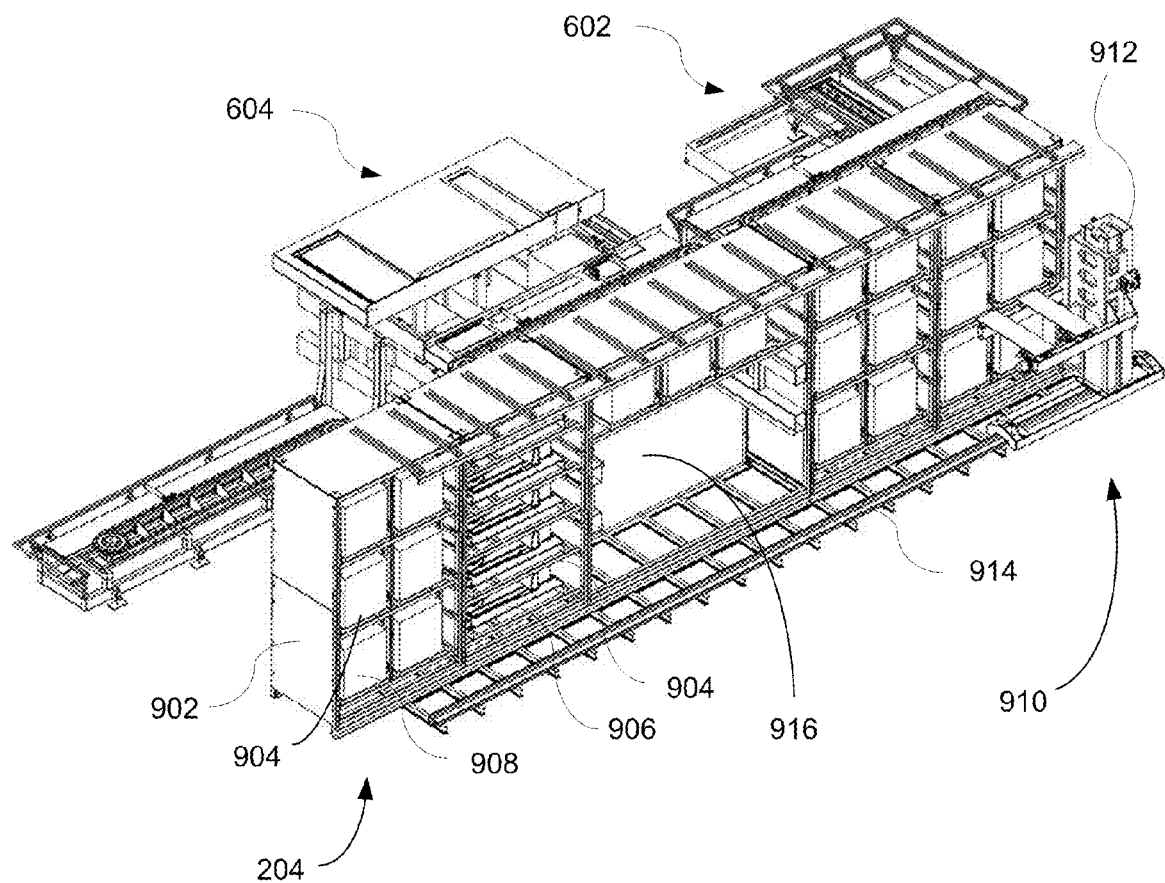
FIG. 9 is a perspective view of the internal components of the warehouse and the swap lane stations according to some embodiments.

FIG. 9 is a perspective view of the internal components of the warehouse 204 and their relationship with the cleaning station 602 and the swap station 604. The warehouse 204 includes a modular system of racks 902 each with rack modules 904 for charging different batteries 104. This expandable modular system is configured to charge a variety of differently sized batteries. FIG. 9 shows an embodiment for storing and charging flat batteries 906 and thick batteries 908. In some embodiments, forced air cooling ducts and fire proof separators are also employed in the racks 902 to protect the batteries 104.

The warehouse 204 also includes an automated robotic mechanism 910. The automated robotic mechanism 910 that in some embodiments includes a robot 912 that travels on rails 914. FIG. 9 illustrates an embodiment where the battery storage racks 902 are placed between the swap station 604 (and cleaning station 608) and the automated robotic mechanism 910. The robot 912 moves along one or more rail(s) 914 along the length of the racks in the warehouse. In some embodiments, the robot 912 is configured to remove an appropriately sized battery 104 from the side of the warehouse storage rack 902 opposite the vehicle 102, and then transfers the battery 104 through the opening 916 in the racks 902.

It should be noted that in some embodiments all of the rack modules 904 are used for charging. As such, a switching board routes the charging power to the rack modules 904 which contain batteries 104 that need to be charged. In other embodiments, rack modules 904 for charging and other rack modules 904 that only store the batteries are provided. In some embodiments, the automated robotic mechanism 910 shuffles batteries 104 between the charging rack modules 904 and the storage rack modules as needed.

Figure 10A:
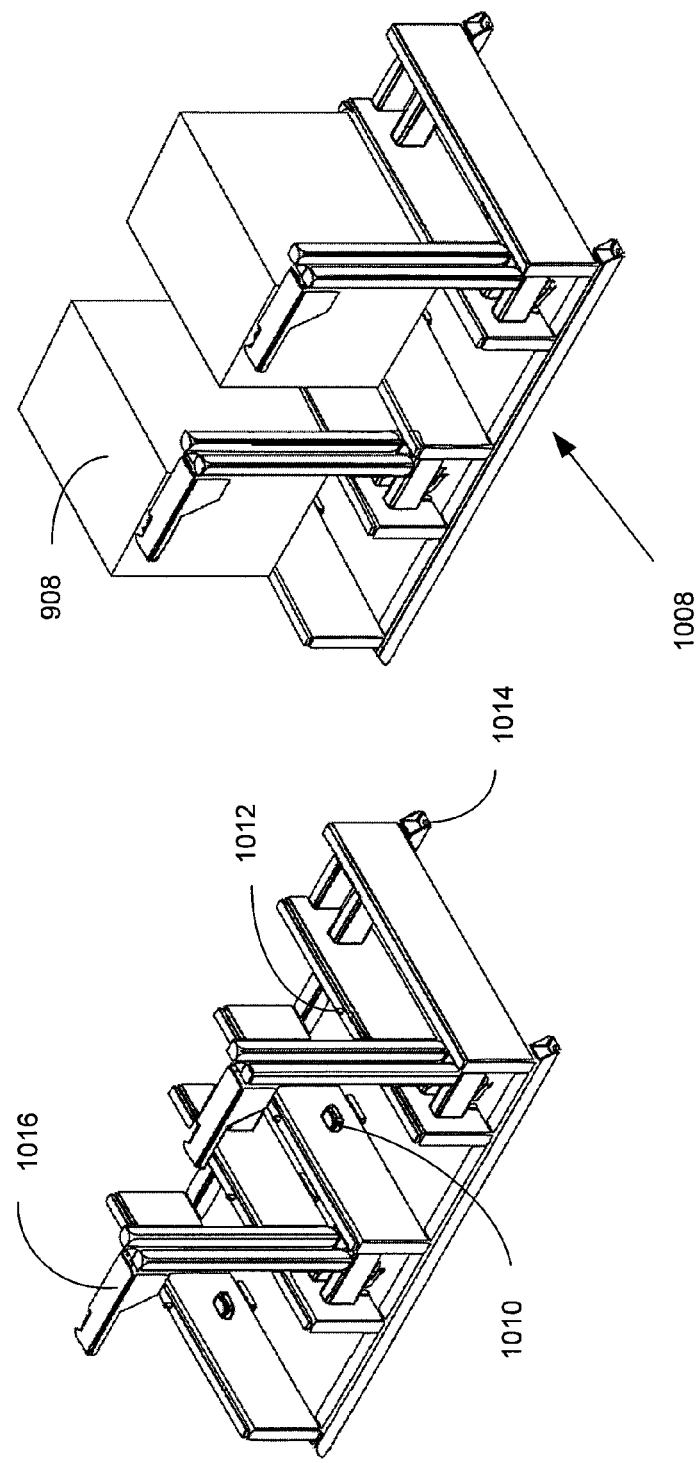
FIG. 10A is a detailed perspective view of rack modules configured to charge and store thick battery packs.
Figure 10B:
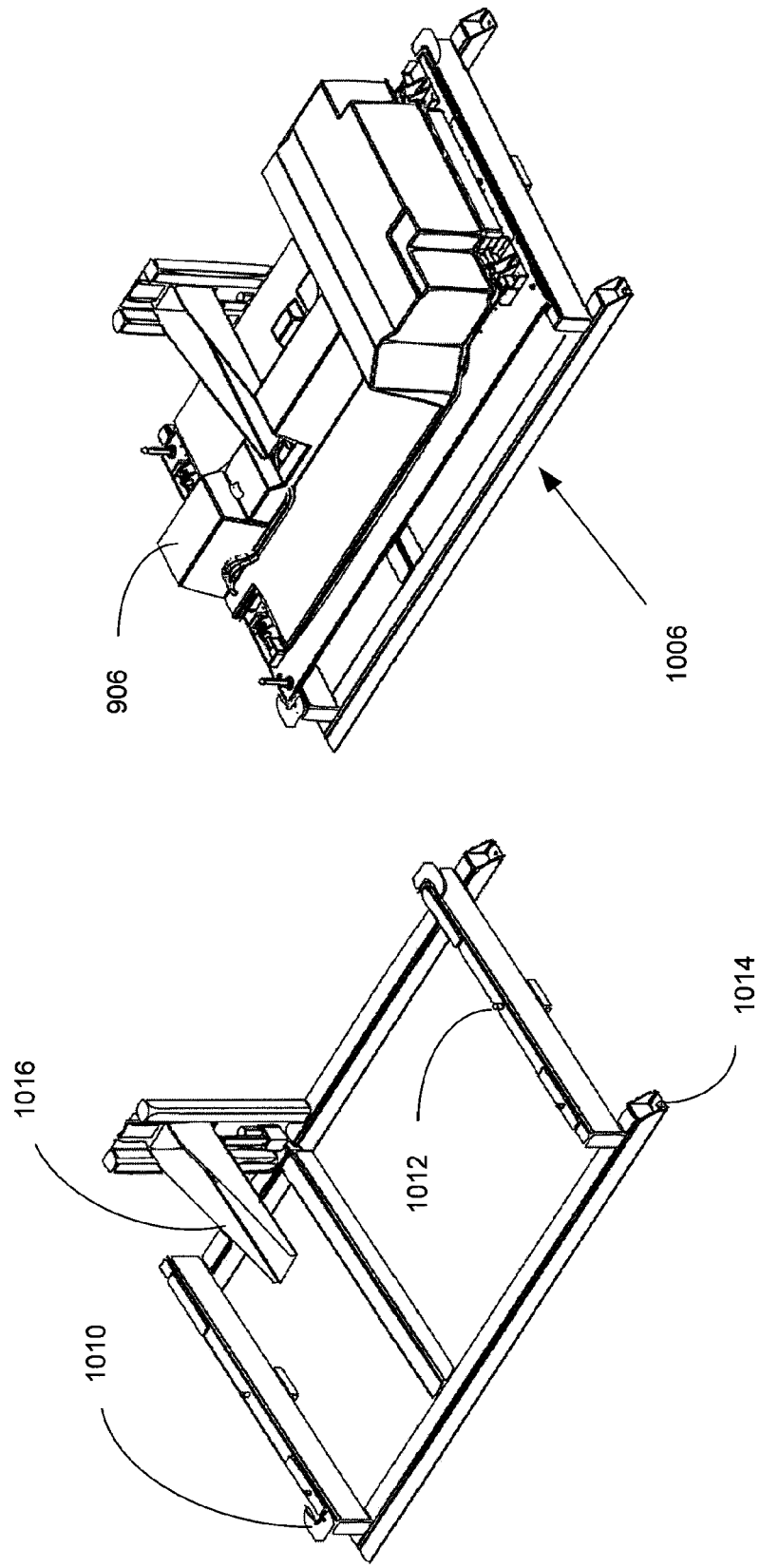
FIG. 10B is a detailed perspective view of rack modules configured to charge and store flat battery packs.

FIGS. 10A and 10B are perspective views illustrating two embodiments of the rack modules 904. The flat battery rack module 1006 is built to store and charge flat batteries 906, while the thick battery rack 1008 module is configured to store and charge thick batteries 908. The warehouse 204 is configured to accommodate racks 902 of a variety of configurations including the two illustrated in FIGS. 10A and 10B. Each rack module 904 is equipped with the mechanical and electrical interfaces that are specific to the particular type of battery it supports.

FIG. 10A illustrates an embodiment for a thick battery 908 and its corresponding thick battery rack module 1008. The thick battery rack module 1008 includes a battery locating feature 1010, a battery presence sensor 1012, a frame location hole 1014, and a connector actuator arm 1016. The battery locating feature 1010 facilitates the thick battery 908 being positioned in a specific location. Once the battery presence sensor 1012 senses the thick battery 908 is in place, the connector actuator arm 1016 connects with the thick battery 908 and begins charging. In some embodiments, the connector actuator arm 1016 connects to the thick battery at an electrical connection interface on the thick battery 908 which is also used to electrically connect the thick battery 908 to the vehicle 102 when in use.

FIG. 10B illustrates the same elements (battery locating feature 1010, a battery presence sensor 1012, a frame location hole 1014, and a connector actuator arm 1016) used in the flat battery rack module 1006 is built to store and charge flat batteries 906 and as shown in FIG. 10A. These same elements are utilized to service batteries of other dimensions from the ones illustrated in FIGS. 11A and 11B.

Figure 11A:
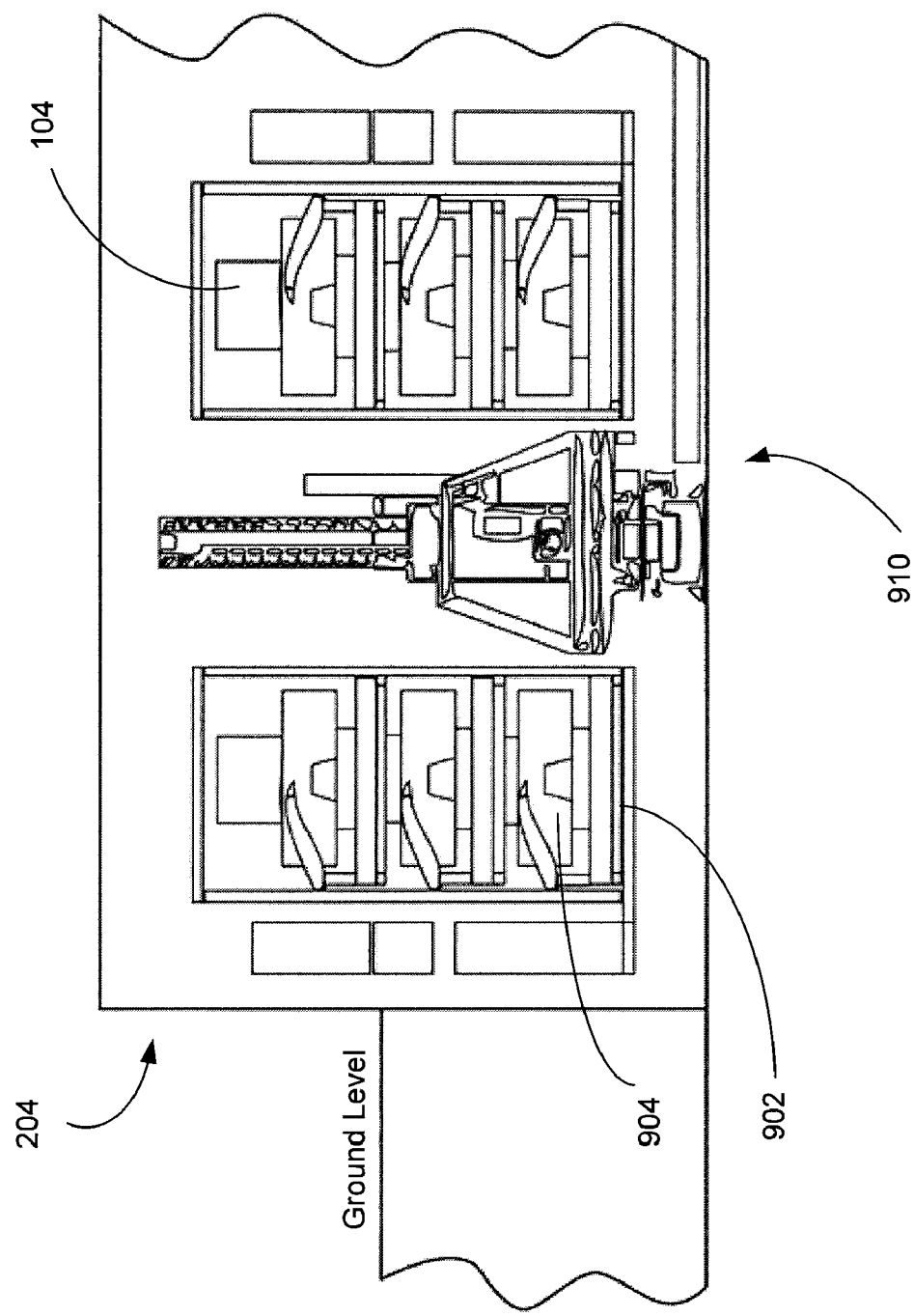
FIG. 11A is a side cut away view of an expandable modular warehouse partially above ground according to some embodiments.
Figure 11B:
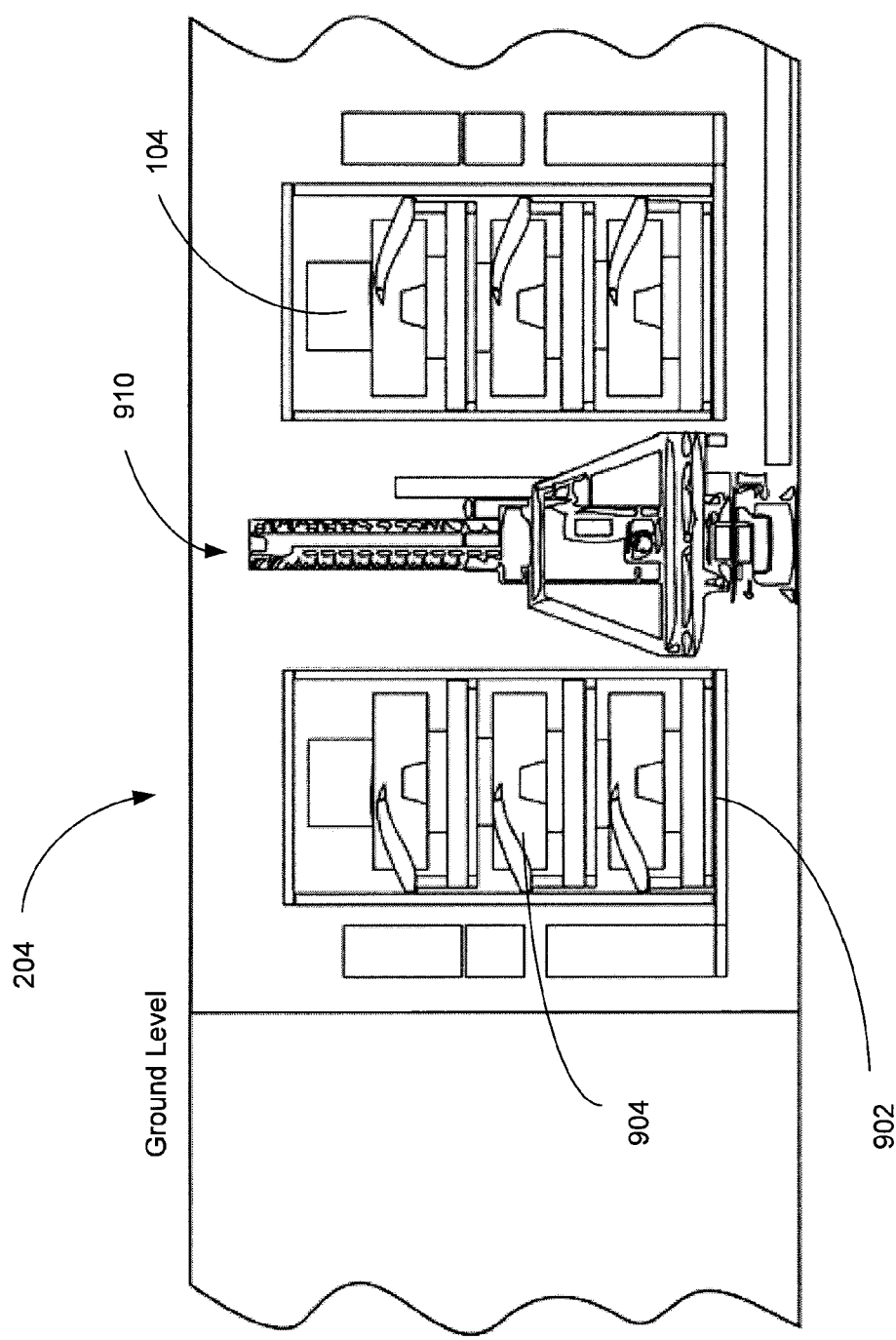
FIG. 11B is a side cut away view of an expandable modular warehouse completely below ground according to some embodiments.

FIGS. 11A and 11B are cut away side views illustrating that the warehouse 204 can be configured in a variety of ways depending on the needs of the specific location. In some embodiments, some of the batteries 104 are stored in the rack modules 904 of the racks 902. FIGS. 11A and 11B show racks 902 on both sides of the automated robotic mechanism 910. Some embodiments will have racks 902 only on one side of the automated robotic mechanism 910. In some embodiments, some batteries 104 are stored underground while others are stored above ground. In some embodiments, all lithium batteries are stored underground. When the batteries 104 are stored underground, they benefit from the thermal insulation and stable temperature regime of the earth's crust, thus cutting down on cooling or heating costs of the warehouse 204. Furthermore, the batteries 104 are protected from vehicle collisions, and they are safer from external fires. Also, if a battery 104 explodes or causes a fire, its underground location creates an added protection to the users 110 and service people.

In some embodiments, the warehouse 204 is modular as shown in FIG. 11. The warehouse 204 can be reconfigured to accommodate more batteries 104 by adding racks 902 or rack modules 904 to the existing racks 902 and rack modules 904. In some embodiments, new rack modules 904 are added to the top of existing rack modules 904, and thus as the warehouse increases in capacity it also grows in height or length. This modular design easily increases the total capacity or volume of the warehouse 204 by merely increasing the height or length of the warehouse walls.

Figure 12:
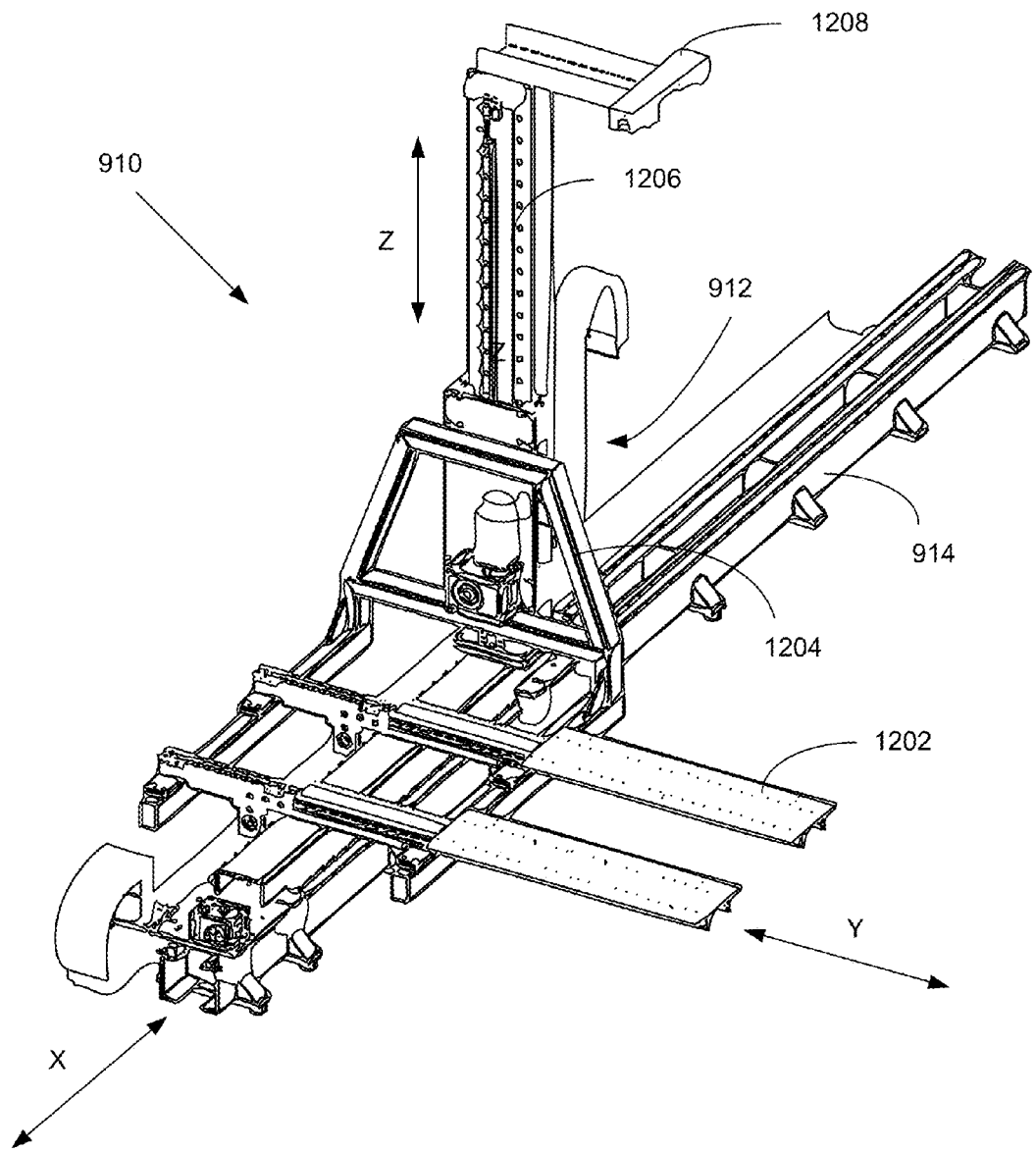
FIG. 12 is a detailed perspective view of the automated robotic mechanism of FIG. 9.

FIG. 12 is a perspective view of the automated robotic mechanism 910. The robotic mechanism includes rails 914 and a robot 912 having a translation platform 1202, a main body 1204, a central vertical rail 1206, and one or more support arms 1208. The robot 912 has three axis of translation, which corresponds to three degrees of freedom. In embodiments of the battery exchange station 106 where swap lanes 202 are on both sides of the warehouse 204, the robot 912 has a translation platform 1202 that extends on either side of the main robot body 1204 (the Y-direction). The translation platform(s) 1202 slide under the batteries 104 to lift them from one location to another. In some embodiments, with thick batteries 908 only one of two translation platforms 1202 is utilized. The robot 912 travels along rails 914 parallel to the swap lane 202 inside the warehouse 204 in the X-direction. The translation platform(s) 1202 can also travel up and down in the Z-direction by means of the central vertical rail or ladder 1206 as shown. The robot 912 is supported by one or more upper support arms 1208 which run along one or more rails 914 on the top of the warehouse (not shown) and keep the robot 912 from twisting or bending out of alignment. These mechanisms working together allow automated robotic mechanism to move differently shaped batteries up and down and in and out of the rack modules 904 as well as delivering them to the battery exchange system 1300 (described below).

Figure 13:
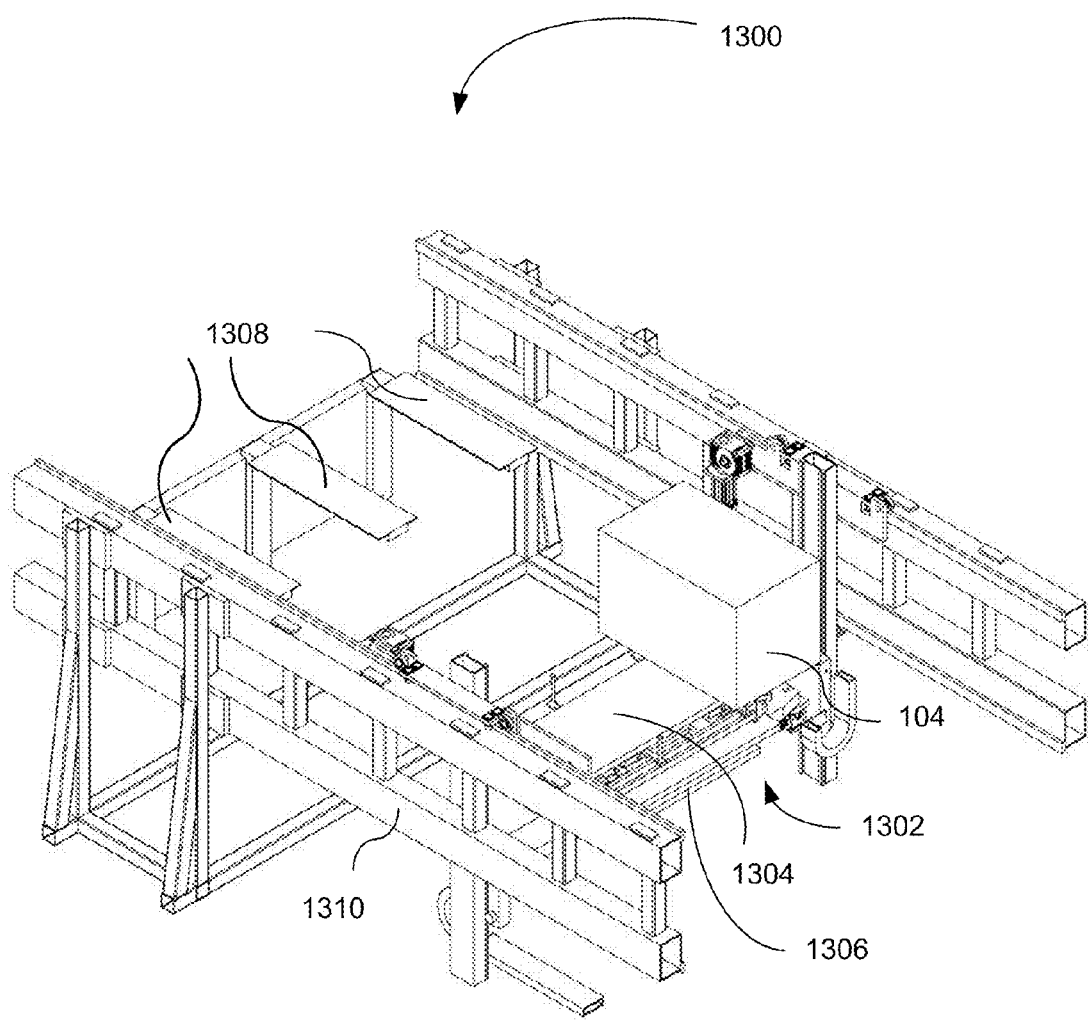
FIG. 13 is a perspective view of the battery exchange system according to some embodiments.

FIG. 13 is a perspective view of the battery exchange system 1300 of some embodiments. The battery exchange system includes: a shuttle 1302, an exchange platform 1304, a lift mechanism 1306, one or more standby locations 1308, and a shuttle track 1310. The battery exchange system 1300 inserts a battery 104 into a vehicle 102 and also removes a battery 104 from a vehicle 102. The battery exchange system 1300 also transfers batteries 104 to and from the warehouse 204.

In some embodiments, the battery exchange system 1300 has three translational degrees of freedom, to service a variety of different vehicles 102 and batteries 104. In some embodiments, the battery exchange system 1300 also has one or more rotational degrees of freedom which allow the system to position the battery in the right location in the electric vehicle. The shuttle 1302 travels between the warehouse 204 and the swap station 604 in a direction perpendicular to the direction of the swap lane 202. The shuttle 1302 has an exchange platform 1304 which is configured to support a battery 104. The exchange platform 1304 is configured to rise vertically by means of a lift mechanism 1306 described in more detail in relation to FIG. 14, and it can also slide in the back and forth direction of the swap lane (perpendicular to the axis of the shuttle track 1310). In some embodiments, the exchange platform is also configured to rotate about a vertical axis, in order to correct for any yaw misalignment between the exchange platform 1304 (and battery 104 it supports) and the battery bay 108 of the vehicle 102.

Figure 14:
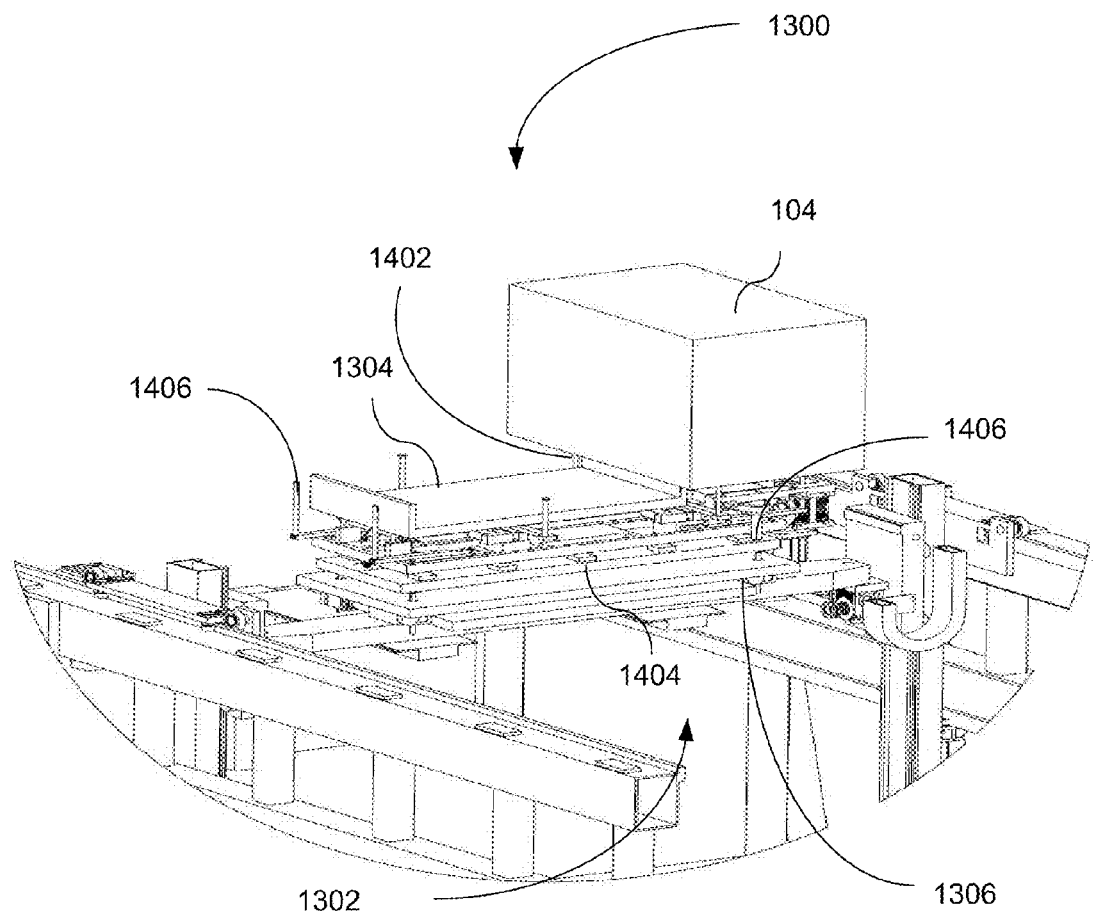
FIG. 14 is a detailed perspective view of the battery exchange system of FIG. 13.

FIG. 14 is a detailed perspective view of portions of the battery exchange system 1300. The exchange platform 1304 includes a gripper 1402 which is configured to hold the battery 104. The gripper is equipped with all the necessary hardware to safely grasp the battery 104 while safely exchanging the battery 104. Different grippers 1402 may be provided for batteries of different sizes, or a universal (or partially universal) gripper 1402 may be provided. In some embodiments, a rack is provided inside the warehouse 204 for housing several grippers 1402 for different sized batteries 104. In these embodiments, when needed, the appropriate gripper 1402 is retrieved by the automated robotic mechanism 910 and attached to the exchange platform 1304. Then, the appropriately sized battery is handled by the gripper 1402 (either before or after it is attached to the exchange platform). The gripper 1402 is replaced when the station management system learns that there is a vehicle whose battery requires a different gripper than that currently attached to the exchange platform 1304.

Various types of lift mechanisms 1306 may be employed to raise the exchange platform 1304 and its battery 104 into a cavity or bay 108 in the vehicle 102. In some embodiments, the exchange platform 1304 raises by means of a scissor lift. In some embodiments, the exchange platform 1304 raises by means of a hydraulic lift, while in other embodiments, other forms of lifting are used.

In some embodiments, the shuttle 1302 also employs one or more indexing system(s) 1404. The indexing system(s) 1404 are configured to measure alignment between the exchange platform 1304 and the cavity 108 or battery 104 at the underside of the vehicle 102, locate the position of the vehicle 102 and battery 104, and/or adjust the exchange platform 1304 and gripper 1402 so that the gripper 1402 is aligned to grip the discharged battery 104 and remove it from the electric vehicle 102. In some embodiments, the indexing system 1404 includes an image processing system that uses cameras to identify the location of the battery above the exchange platform 1304. The indexing system 1404 assists in aligning the battery exchange system 1300 with the battery or bay. In some embodiments, final alignment of the exchange platform 1304 and gripper 1402 with the discharged battery 104 in the vehicle 1406 is achieved by using locating pins which align themselves into pilot holes in the bottom section of the battery 104 discussed in application Ser. No. 12/428, 932, filed Apr. 23, 2009, entitled "Electric Vehicle Battery System."

In some embodiments, the battery exchange system 1300 also includes one or more unlocking mechanisms 1406 for unlocking the locks discussed in 12/428,932, filed Apr. 23, 2009, entitled "Electric Vehicle Battery System". In some embodiments, the unlocking mechanism 1406 is configured to electronically activate a lock attaching the battery to the vehicle 102 and unlock it. In some embodiments, the unlocking mechanism 1406 is configured to mechanically activate the vehicle's lock and unlock it. In some embodiments, the vehicle 102 has two locks that require activation, or has one lock that required both electronic and mechanical activation. In some embodiments the unlocking mechanism 1406 is a key. In some embodiments, the key is on the gripper 1402. In other embodiments, the key is a part of the exchange platform 1304 or the shuttle 1302. In some embodiments, after the key unlocks the lock, the key retracts into the platform 1304.

Figure 15:
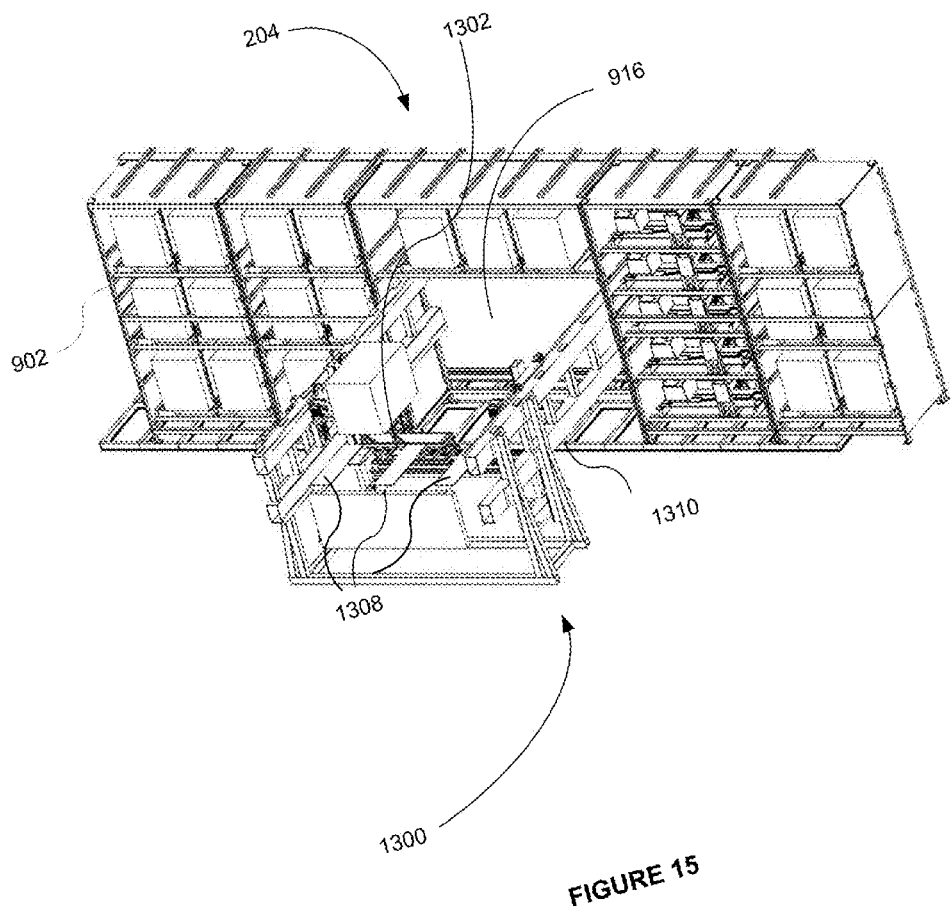
FIG. 15 is a perspective view of the battery exchange system and the warehouse according to some embodiments.

FIG. 15 is a perspective view of the components of the battery exchange system 1300 and select components of the warehouse 204. FIG. 15 illustrates an embodiment in which the shuttle track 1310 extends into the opening 916 in the racks 902 of the warehouse 204 so that the shuttle 1302 can be positioned in the opening 916 to receive a battery 104 from the automated robotic mechanism 910, or bring a battery 104 to the automated robotic mechanism 910. In some embodiments, the shuttle 1302 moves along the track 1310 extending perpendicular to the rails 914 on which the robot 912 of the automated robotic mechanism 910 moves.

FIG. 15 also illustrates that the shuttle track 1310 extends to one or more battery standby locations 1308 where batteries are temporarily stored during the exchange process. In some embodiments, a fully charged battery 104 is temporarily stored at a stand-by location 1308 until a discharged battery 104 has been removed from the vehicle 102. In other embodiments the discharged battery 104 is temporarily stored in a stand-by location until the fully charged battery 104 is inserted into the vehicle. In some embodiments, no stand-by locations are needed because separate battery exchange systems 1300 are used for removing the discharged batteries and inserting the fully charged batteries. In some embodiments, no stand-by locations are needed because the removed discharged battery 104 is returned to the warehouse 202 before the automated robotic mechanism 910 delivers a new charged battery to the battery exchange system 1300.

Figure 16A:
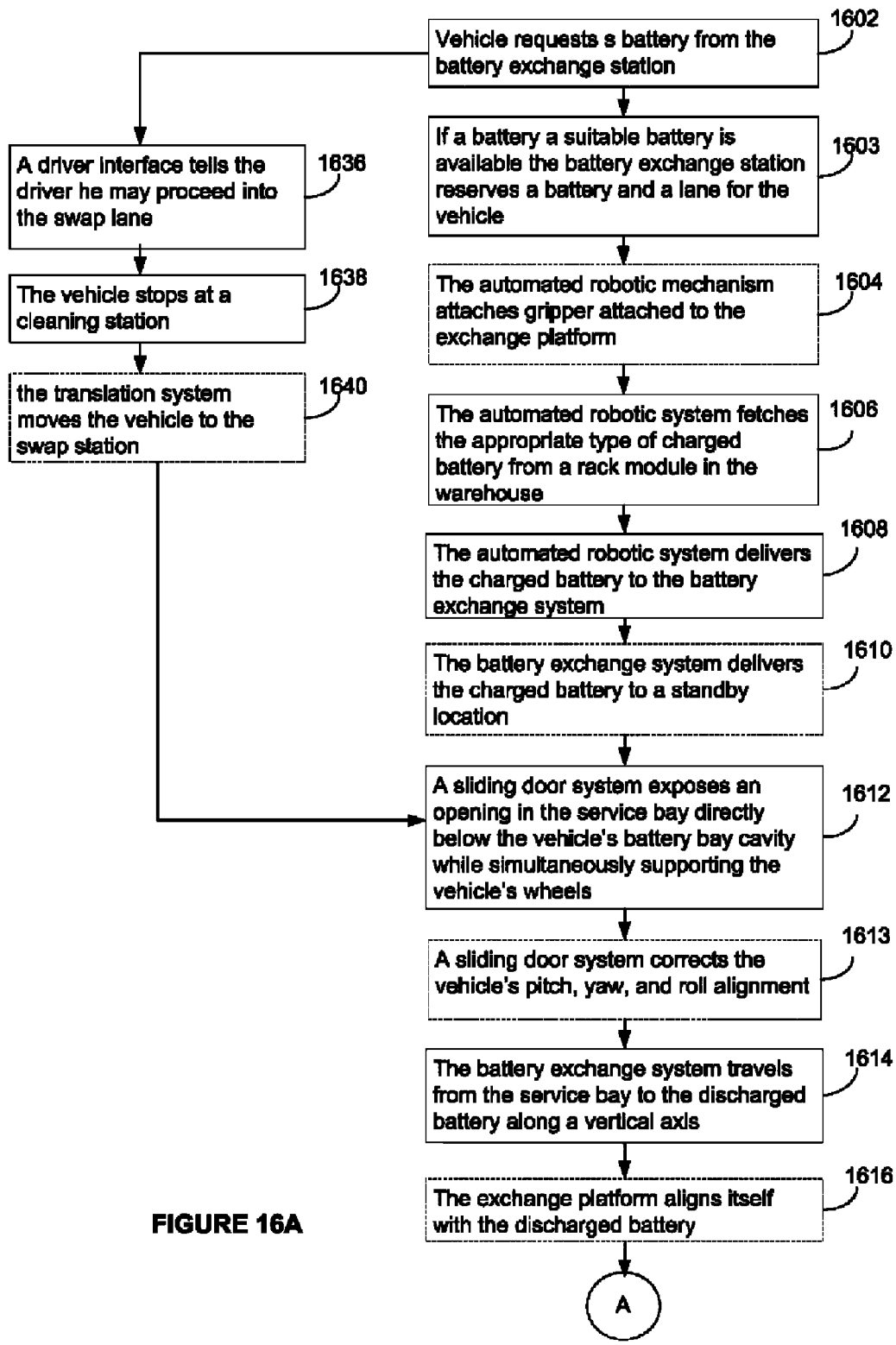
FIG. 16A is a flow diagram of part of a process of exchanging a battery.
Figure 16B:
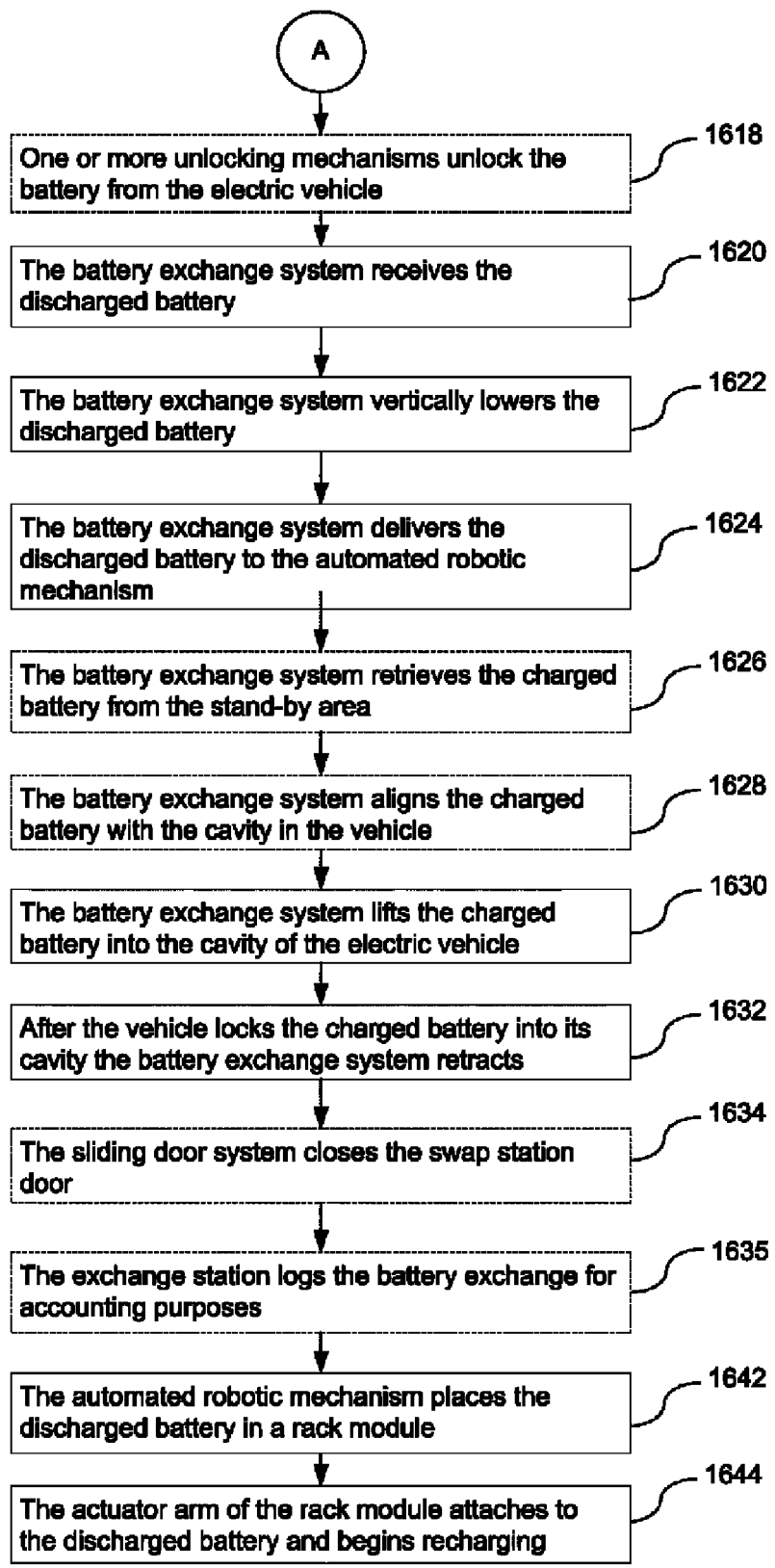
FIG. 16B is a flow diagram of part of a process of exchanging a battery.

FIGS. 16A and 16B are flow diagrams illustrating a method of exchanging a battery that include some or all of these steps. When the electric vehicle approaches the battery exchange station, it wirelessly communicates with the battery exchange station to tell it the type of battery the vehicle needs (1602). If a suitable battery is available the battery exchange station reserves a battery and a lane for the vehicle (1603). The automated robotic mechanism determines if the appropriate type of gripper attached to the exchange platform, and if necessary fetches and attaches the appropriate gripper to the exchange platform (1604). The automated robotic system fetches the appropriate type of charged battery, from a rack module in the warehouse (1606). In some embodiments, the automated robotic system fetches the charged battery while the vehicle is being washed. In some embodiments, the automated robotic mechanism retrieves the charged battery while the vehicle is waiting to enter the swap lane or before. The timing of these steps may be dependant on the workload of the battery exchange station. The charged battery is carried by the opening in the warehouse where it is delivered to the battery exchange system (1608). The battery is loaded onto the gripper on the exchange platform of the exchange device shuttle. Then in some embodiments the exchange platform travels to the swap station service bay and delivers the charged battery to a standby location (1610). The standby location is a platform which supports a battery during a battery exchange cycle in order to save time during the exchange process. In some embodiments, the shuttle leaves the charged battery in standby location. In some embodiments, several charged batteries are kept at the standby location simultaneously in a cue for the next several vehicles that need batteries. A sliding door system slides and exposes an opening in the service bay directly below the vehicle's battery bay cavity while simultaneously supporting the vehicle's wheels (1612). In some embodiments, the sliding door system also corrects the vehicle's pitch, yaw, and roll alignment (1613). The opening is variable and depends on vehicle's dimensions. Once the door to the swap pit has opened the lift mechanism of the shuttle raises the exchange platform along a vertical axis substantially perpendicular to the plane formed by the bottom surface of the vehicle (along the Z-axis of FIG. 5A) (1614). In some embodiments, the exchange platform aligns itself with the discharged battery using alignment pins and/or cameras or other feedback mechanisms (1616). In some embodiments, the exchange platform has three degrees of freedom to align itself with the discharged battery, and also can rotate to align with any rotation or yaw of the vehicle. In some embodiments, one or more unlocking mechanisms unlock the battery from the electric vehicle (1618). Once the discharged battery is unlocked, the battery bay in the electric vehicle unlatches the battery and releases it onto the exchange platform. The gripper on the exchange platform receives the discharged battery (1620). In some embodiments, the gripper mounted on the exchange platform actuates a latching mechanism in the vehicle to unlock the latches and release the battery. Once the discharged battery is unlatched from the vehicle and attached to the gripper, the lift mechanism vertically lowers the discharged battery from the vehicle along a vertical axis substantially perpendicular to the plane formed by the bottom surface of the vehicle (along the Z-axis of FIG. 5A) (1622). The shuttle moves along rails and carries the exchange platform with the discharged battery to the opening in the warehouse where it is delivered to the automated robotic mechanism (1624). Then, the battery exchange system returns to the stand-by area where the charged battery has been temporarily stored and retrieves it (1626). Based on recorded digital data of the discharged battery location in the vehicle, the battery exchange system aligns the charged battery with the cavity in the vehicle (1628). The lift mechanism lifts the charged battery into the cavity of the electric vehicle along a vertical axis substantially perpendicular to the plane formed by the bottom surface of the vehicle (along the Z-axis of FIG. 5A) (1630). The battery exchange system supports the charged battery until the vehicle locks the charged battery. In some embodiments, the gripper contains an actuating device which latches the battery into the vehicle. Then the lift mechanism retracts the exchange platform and gripper (1632). In some embodiments, the vehicle performs health check process. Upon completion of successful health check, rising supports are retracted, the swap station door is closed (1634). Then the vehicle wheel, stopping unit is released and the vehicle is conveyed toward the exit of the swap lane. In some embodiments, the exchange station logs the battery exchange for accounting purposes. (1635). In some embodiments, the driver drives the vehicle out of the exchange station once the wheel stopping unit had been removed. In some embodiments, this method of exchanging a discharged battery for a charged battery occurs in under five minutes. In some embodiments, less than 5 minutes passes from when the vehicle enters the swap lane to when it exits.

As discussed with relation to FIGS. 3 and 4, the swapping process may take place underground or above ground. In underground embodiments the battery exchange system is located below ground when it is at rest. The exchange platform and gripper move above ground only to the extent needed to receive a discharged battery from the vehicle and insert a charged battery into the vehicle's cavity. It should also be noted that, in some embodiments, the standby area may be used for discharged batteries instead of charged batteries. In these embodiments the discharged battery is moved to the standby area while the charged battery is inserted into the vehicle. Then it is moved to the warehouse. Similarly, in some embodiments, the standby area is used for both charged and discharged batteries. In this embodiment the number of trips to the warehouse is minimized because the discharged battery is moved to the standby unit. Then the charged battery is retrieved from the standby unit, and after the charged battery is inserted into the vehicle the discharged battery is moved to the warehouse. In still other embodiments no standby unit is used. The discharged battery is taken to the warehouse before the charged battery is retrieved from the warehouse. In some embodiments, two battery exchange systems are utilized along with two sliding door systems. In this embodiment, the first battery exchange system removes a discharged battery at a first location, then the car is conveyed to a second location where a second battery exchange system inserts a charged battery. This embodiment allows one car to have its discharged battery removed while another car ahead of it in the cue is simultaneously having a charged battery inserted.

In some embodiments, during the charged battery retrieval steps, the exchange station system is performing other preparatory functions. Once the swap lane is free, a driver interface tells the driver he may proceed into the swap lane (1636). In some embodiments, a vehicle translation system in the swap lane translates the vehicle from one substation to the next. In some embodiments, the vehicle stops at a cleaning station, where dirt and debris is removed from the underside of the battery (1638). In some embodiments, the entire outside of the vehicle is cleaned at the cleaning station. Then the translation system moves the vehicle to the swap station (1640). The swap station is a location along the swap lane where the vehicle stops and is immobilized by a wheel stopping unit. Once the vehicle is conveyed to the swap station and its position is set by the stopping unit, the sliding door system exposes an opening in the service bay as described in step (1612).

Similarly, in some embodiments, while the charged battery is being retrieved from a standby unit and inserted into the vehicle (steps 1626-1632) the automated robotic mechanism moves the discharged battery from the opening in the warehouse to its proper rack module (1642). Then the actuator arm of the rack module attaches to the discharged battery and begins recharging it (1644).

In some embodiments, the battery exchange station is built to accommodate the minimum amount of batteries to allow maximal efficiency of the station during rush hours when traffic volume into the station is high. The bottleneck of the process is the time required to perform battery exchange. Thus the charging system is designed to supply a fresh charged battery anytime an exchange cycle is completed. Each discharged battery that enters the station during rush hour immediately begins fast charging. Once the battery is fully charged it is ready to be assembled on a vehicle. The charging system simultaneously charges the number of batteries which are required to deliver a charged battery at every exchange cycle. For example, if it takes 40 minutes to charge a battery and each exchange cycle lasts 4 minutes, the station is designed to charge 10 batteries simultaneously. Therefore, every 4 minutes, a fresh charged battery is ready to be inserted into a vehicle. In such manner, there is a minimum amount of batteries in storage while still meeting the demands of the users. If traffic volume into the station is reduced, the station management system may decrease the rate of charging or delay charging events to later hours when the price of electricity may be lower. One advantage of the electric vehicle system is that, except at "rush hour" when the batteries are charged at their maxim rate, the batteries can be charged at otherwise "low" consumption times, allowing electricity producers more effective grid management. Furthermore, in some embodiments, the electricity from unneeded fully charged batteries can be returned to the electric grid to alleviate peak demands.

Several methods of battery exchange were described above. A shuttle module controls the movement of the batteries from the storage and charging area to the car exchange area. It should be noted that the precise mechanism described above is not necessary. For instance, battery exchange is only partially automated, with humans, or human controlled machines performing the functions described above.

Hardware and Software Controls

The exchange station makes use of several hardware and software controls. A real time central controller monitors several programmable logic controllers (PLCs). Each PLC is engaged to an automated device and controls the device operation. The PLC monitors position, speed, acceleration and health of the automation device which is under its control. The real time central controller is slaved under the station management system which takes the decisions and commands each of the processes which occur in the station.

The Station Management system is a software and hardware system which controls substantially all events and operations which take place in the battery exchange station. The management system is communicating with the service and control center and with the electric vehicles which are in the vicinity of the battery exchange station. The management system is capable of making basic decisions about the operation of the station. In some embodiments, the station management system may require some remote assistance in cases of exceptional operating conditions. Substantially all battery exchange station subsystems are slaved under the station management system and send status reports to the management system.

The Power Management System monitors and enables the flow of electric current from the electric grid to the station subsystems. The power management controller monitors the operation of the station electric system.

The Heating, Ventilation and Air Conditioning system (HVAC) substantially continuously monitors the internal environment inside the exchange station. Temperature, humidity and pressure are constantly monitored and controlled to prevent those parameters to exceed their allowed values. During the charging process, a considerable amount of heat is emitted from the batteries and the charging system. The HVAC system controls the temperature in the storage room by evacuating heat out of the battery charging area by means of a positive air flow. In some battery pack designs, cold air is blown into cooling ducts, located inside the battery packs, in order to keep the batteries temperature within safe margin during the charging process. The ventilation system performs several internal ambient air replacements per hour, to prevent accumulation of toxic or flammable gasses inside the station structure and basement. The ventilations system sucks filtered air from outside the station and creates positive pressure differences between the internal cavities of the station to the external environment. In such manner, different contaminations or fuel vapors (which may come from a nearby gas station) do not substantially enter the station structure and are kept from the underground swap pit and from the battery chargers in the warehouse.

The station is also equipped with toxic gas detection system which detects emission of hydrogen and other hydrocarbon or flammable and toxic gasses when and if batteries are abused and thermal runaway of battery cells occur. A gas analyzer sensor will shut down all electrical power systems and initiate alarms in case of detection of flammable gases. The HVAC system will ventilate the internal cavity of the station to decrease the flammable gas concentration. In case of fire, the ventilation of the station will stop and the fire extinguishing system will extinguish the fire.

Fire Detection and Extinguishing System is a redundant fire extinguishing system which uses environmentally friendly gases that will be initiated if fire is detected. The fire detection and extinguishing system is slaved under the station management system.

It should be noted that the structure of the station has climate controls to control the battery charging area temperature and humidity. For safety reasons, the battery storage area is resistant to fire. Should a fire start in the battery exchange station, the station is equipped with fire detection and extinguishing units. In some embodiments, environmentally friendly gasses are used to control the fire. A back up powder extinguishing system is also in place which may be used in addition to the gas fire control system. In some embodiments, the battery storage area is also resistant to vehicle collisions. As the exchange stations are stand-alone structures exposed to the weather, climate control is useful. In some embodiments, there is a HVAC system that controls the atmosphere in the battery exchange station. In some embodiments, the HVAC system only controls the climate within the battery storage and charging area. In some embodiments, the HVAC system condensing unit is placed on the roof. In some embodiments, the HVAC system pushes cold air into cooling ducts located inside the battery packs. In some embodiments, heating elements for the HVAC system includes a hot water coil. Fans are also used to move the air supply about, allowing in fresh air and supplying the units with appropriately heated or cooled air depending on the ambient conditions. In some embodiments, the battery storage area is sealed off from the environment during normal operation. The battery storage area discharges the batteries onto the robot underneath ground level, and as such is relatively protected from the external environment. In some embodiments, the battery storage area is equipped with a layer of insulating material. In some embodiments, the battery storage area has panels or other mechanisms for manually opening the battery storage area. This is useful in originally loading the batteries into the system, and removing malfunctioning batteries. It is also useful for allowing maintenance of any portion of the ASRS system that might malfunction. In some embodiments, the station has a roof which helps protect the vehicles, swapping system, and battery storage from the elements—keeping it cool from the sun in the summer and keeping the rain and snow off in the winter.

Battery Charging System is a system that controls and monitors the battery charging process. The charging system is comprised of central charging controller which is connected to battery chargers. In some embodiments, fast chargers can charge the batteries at substantially their maximal allowed charging rate. In some embodiments, slower chargers are employed. The central charging system controller monitors the charging processes and alerts the station management system for the state of charge of each of the charging events.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A sliding door system for providing access to an underside of a vehicle, comprising:
   a door configured to slide in a first direction; and
   a conveyor system at least partially built into the door and configured to allow a surface of the conveyor system to slide relative to the door in a second direction opposite to the first direction while supporting at least one wheel of a vehicle on the surface of the conveyor system.

2. The sliding door system of claim 1, wherein the door is slidably coupled to at least one rail.

3. The sliding door system of claim 1, wherein said sliding door system is configured to couple to a service bay such that when the door slides it exposes an opening above the service bay.

4. The sliding door system of claim 3, wherein the opening exposed is of variable size, and is sizable with respect to one or more of the vehicle's wheelbase and track.

5. The sliding door system of claim 3, wherein the opening exposed is sized to receive a battery for the vehicle there through.

6. The sliding door system of claim 1, wherein the conveyor system is one or more conveyor belts each configured to support a distinct wheel.

7. The sliding door system of claim 6, wherein the one or more conveyor belts include a first conveyor belt and a second conveyor belt, wherein the first conveyor belt is larger than the second conveyor belt to support differently sized vehicles.

8. The sliding door system of claim 6, wherein the one or more conveyor belts each have an upper supporting surface, wherein the upper supporting surface is flush with the door.

9. The sliding door system of claim 6, wherein the one or more conveyor belts are free to rotate without power.

10. The sliding door system of claim 6, further comprising:
    one or more electric motors, wherein each electric motor rotates a respective conveyor belt.

11. The sliding door system of claim 10, wherein the one or more conveyor belts are configured to alter the yaw of the vehicle.

12. The sliding door system of claim 1, wherein the conveyor system is one or more roller pads each for supporting a distinct wheel.

13. The sliding door system of claim 1, wherein the sliding door system is configured to alter the yaw of the vehicle.

14. The sliding door system of claim 13, further comprising:
    a vehicle translation system for automatically translating the vehicle onto the sliding door system.

15. The sliding door system of claim 14, further comprising:
    a vehicle pushing element which makes contact with one wheel of the vehicle and automatically translates the vehicle by pushing the vehicle forward.

16. The sliding door system of claim 1, wherein the conveyor system supports at least a portion of the vehicle's weight in a third direction substantially perpendicular to the first and second directions.

17. The sliding door system of claim 1, wherein the door further comprises one or more rising supports in the door configured to support at least a portion of the weight of the vehicle when the one or more supports are in an extended position.

18. The sliding door system of claim 17, wherein the one or more rising supports are configured to alter the pitch or roll of the vehicle.

19. The sliding door system of claim 17, wherein the one or more rising supports each have an upper supporting surface that is flush with the door when the supports are in a retracted position.

20. The sliding door system of claim 1, further comprising an additional conveyor system separate from the door and configured to slide in the second direction while supporting at least one different wheel of the vehicle.

21. The sliding door system of claim 1, wherein the conveyor system comprises a first conveyor and a second conveyor parallel to the first conveyor, wherein the first conveyor is configured to support a front wheel of the vehicle, and the second conveyor is configured to support a rear wheel of the vehicle.

22. A sliding door system for providing access to an underside of a vehicle, the system comprising:
    a door coupled to a service bay and configured to slide in a first direction to expose an opening above the service bay; and
    a conveyor system at least partially built into the door, the conveyer system configured to: (i) support at least one wheel of a vehicle in a second direction substantially perpendicular to the first direction, and (ii) allow relative motion between the door and the at least one wheel of the vehicle when the door is slid in the first direction.

23. The sliding door system of claim 22, wherein the door further comprises a first guide coupled to the door, the first guide configured to restrict the relative motion between the door and the wheel when at least one wheel of the vehicle contacts the first guide.

24. The sliding door system of claim 23, wherein the first guide comprises at least one pressure sensor located at a position on the guide corresponding to at least one wheel of the vehicle, the pressure sensor configured to indicate whether the guide has contacted the at least one wheel.

* * * * *